United States Patent [19]

Yamashita et al.

[11] Patent Number: 5,109,354
[45] Date of Patent: Apr. 28, 1992

[54] ELECTRONIC SYSTEM POCKETBOOK APPARATUS

[75] Inventors: Hiromasa Yamashita, Ise; Haruhiro Kikkawa, Tokyo; Kazuya Kiuchi, Tokyo; Shinichi Midorikawa, Tokyo; Kazuo Nagamachi, Tokyo; Satoshi Endoh, Tokyo; Yoshiaki Kitamura, Tokyo; Hiroaki Yoshida, Tokyo; Eiji Takeuchi, Tokyo, all of Japan

[73] Assignee: Kyocera Corporation, Kyoto, Japan

[21] Appl. No.: 502,563

[22] Filed: Mar. 30, 1990

[30] Foreign Application Priority Data

| Mar. 31, 1989 | [JP] | Japan | 1-78465 |
| May 15, 1989 | [JP] | Japan | 1-120651 |
| May 15, 1989 | [JP] | Japan | 1-120652 |
| Jun. 7, 1989 | [JP] | Japan | 1-143146 |
| Jul. 26, 1989 | [JP] | Japan | 1-191399 |
| Oct. 5, 1989 | [JP] | Japan | 1-258888 |

[51] Int. Cl.⁵ .................................. G06F 15/02
[52] U.S. Cl. ........................ 364/708; 364/705.06
[58] Field of Search ............ 364/708, 705.02, 705.06; 402/80 R

[56] References Cited

U.S. PATENT DOCUMENTS

| 4,264,962 | 4/1981 | Kodaira | 364/708 |
| 4,471,440 | 9/1984 | Check, Jr. | 364/466 |
| 4,497,036 | 1/1985 | Dunn | 364/708 |
| 4,545,023 | 10/1985 | Mizzi | 364/708 |
| 4,825,395 | 4/1989 | Kinsor, Jr. et al. | 364/708 |
| 4,870,604 | 9/1989 | Tatsuno | 364/708 |
| 4,918,632 | 4/1990 | York | 364/708 |

OTHER PUBLICATIONS

"Remote Key Input to Personal Computer", *IBM Tech. Disclosure Bulletin*, vol. 29, No. 9, Feb. 1987, pp. 4201-4202 364/709.12.

Primary Examiner—David H. Malzahn
Attorney, Agent, or Firm—Spensley Horn Jubas & Lubitz

[57] ABSTRACT

An electronic system pocketbook apparatus includes a foldable and portable main body, an expansion card holder mounted on the main body, a necessary number of expansion cards held by the expansion card holder, and a communicating unit. The main body has a functions of right and left portions coupled by a cover, is folded upon carrying of the main body so that the right portion overlaps the left portion, a folded portion being fastened by a cover clip provided to the cover, and has basic functions of controlling arithmetic operations and display data processing by using an internal controller, data inputting means, and displaying data on a display unit. The communicating unit performs data transmission/reception between the held expansion cards and the main body via the expansion card holder.

27 Claims, 21 Drawing Sheets

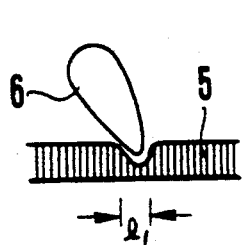 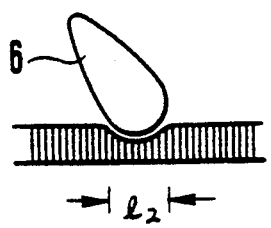 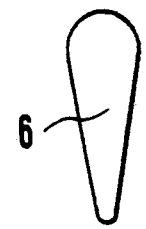
FIG.2(a)  FIG.2(b)  FIG.2(c)
  
FIG.2(d)  FIG.2(e)  FIG.2(f)
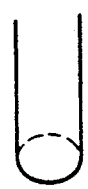 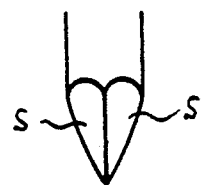
FIG.2(g)  FIG.2(h)

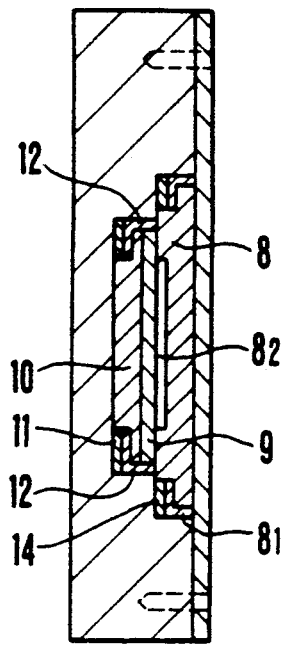
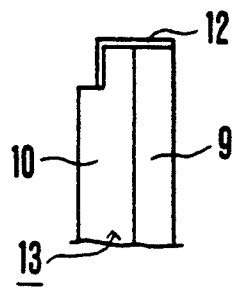
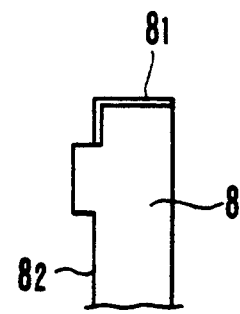
F I G.5(a)   F I G.5(b)   F I G.5(c)
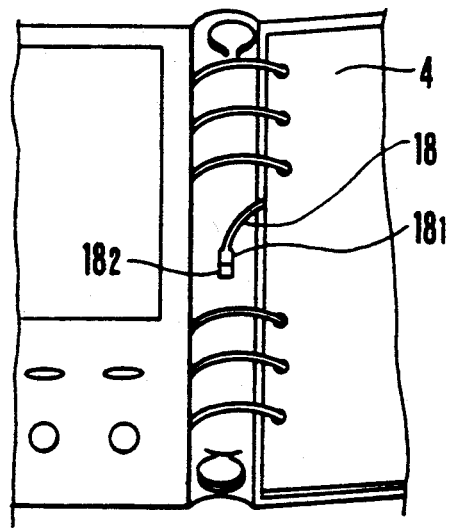
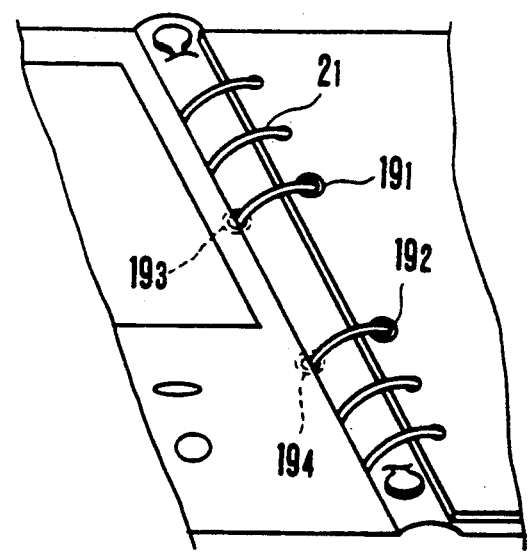
F I G.6   F I G.7

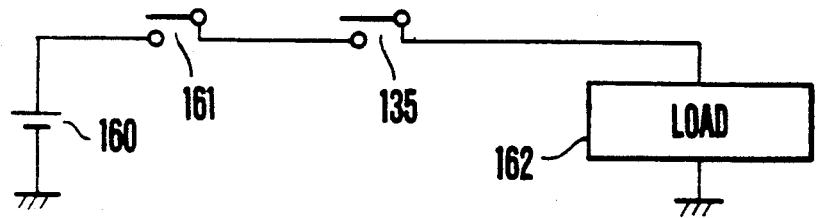
F I G. 22
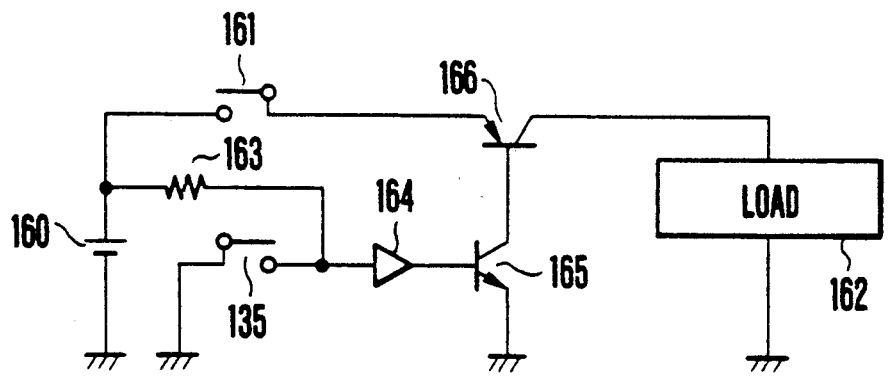
F I G. 23

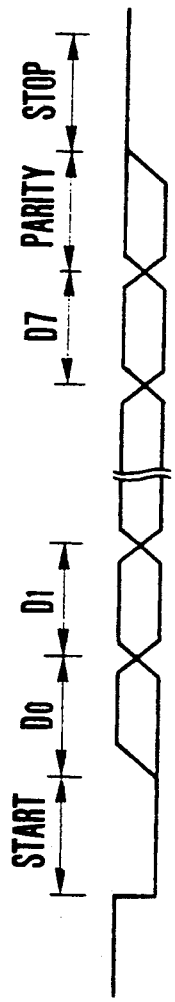
FIG. 42
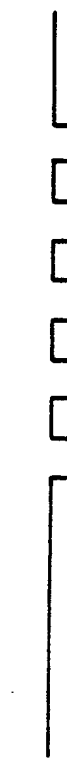
FIG. 43(a)
FIG. 43(b)
FIG. 43(c)
FIG. 43(d)
FIG. 43(e)

ELECTRONIC SYSTEM POCKETBOOK APPARATUS

BACKGROUND OF THE INVENTION

The present invention relates to an electronic system pocketbook apparatus having an electronic processing function.

Conventionally, system pocketbooks have been widely used by office workers for schedule adjustment, memos, and the like. A system pocketbook has a recording paper holder for holding recording paper, and a user writes necessary contents on recording paper held by the recording paper holder. A system pocketbook apparatus of this type, however, is inconvenient since the recording paper must be replaced each year. In order to eliminate this inconvenience, some devices are disclosed in Japanese Published Unexamined Patent Application Nos. 62-107360, 59-68072, and the like. In each of these disclosed devices, a memory card stores necessary contents.

These advanced devices, however, are still unsatisfactory since in order to process a plurality of types of data, a memory card of the apparatus must be replaced for each type of data.

SUMMARY OF THE INVENTION

It is, therefore, a principal object of the present invention to provide an electronic system pocketbook apparatus capable of attaching/detaching a plurality of data bases and arbitrarily determining the number of data bases to be used.

It is another object of the present invention to provide an electronic system pocketbook apparatus smaller than a conventional apparatus.

It is still another object of the present invention to provide an electronic system pocketbook apparatus capable of holding as many basic elements required for an electronic pocketbook as possible in a limited space.

In order to achieve the above objects of the present invention, there is provided an electronic system pocketbook apparatus comprising a foldable and portable main body having functions of right and left portions coupled by a cover, folded upon carrying of the main body so that the right portion overlaps the left portion, a folded portion being fastened by a cover clip provided to the cover, and having basic functions of controlling arithmetic operations and display data processing by using an internal controller, data inputting means, and displaying data on a display unit, an expansion card holder mounted on the main body, a necessary number of expansion cards held by the expansion card holder, and communicating means for performing data transmission/reception between the held expansion cards and the main body via the expansion card holder.

BRIEF DESCRIPTION OF THE DRAWINGS

FIGS. 2(a) to 2(h) are views each showing an information input means;

FIGS. 5(a), 5(b), and 5(c) are views showing a structure for illuminating the LCD;

FIGS. 6 to 11 are views each showing a communicating means between a main body and an expansion card;

FIG. 22 is a circuit diagram showing a circuit used to directly switch on/off a power source by a cover switch;

FIG. 23 is a circuit diagram showing a circuit used to indirectly switch on/off the power source by the cover switch;

FIG. 42 is a view showing a signal format for performing communication between the expansion card holder and the expansion card; and FIGS. 43(a) to 43(e) are views showing signal waveforms for explaining a signal waveform change upon transmission of one bit of data.

DETAILED DESCRIPTION OF THE PREFERRED EMBODIMENT

Figure 1:
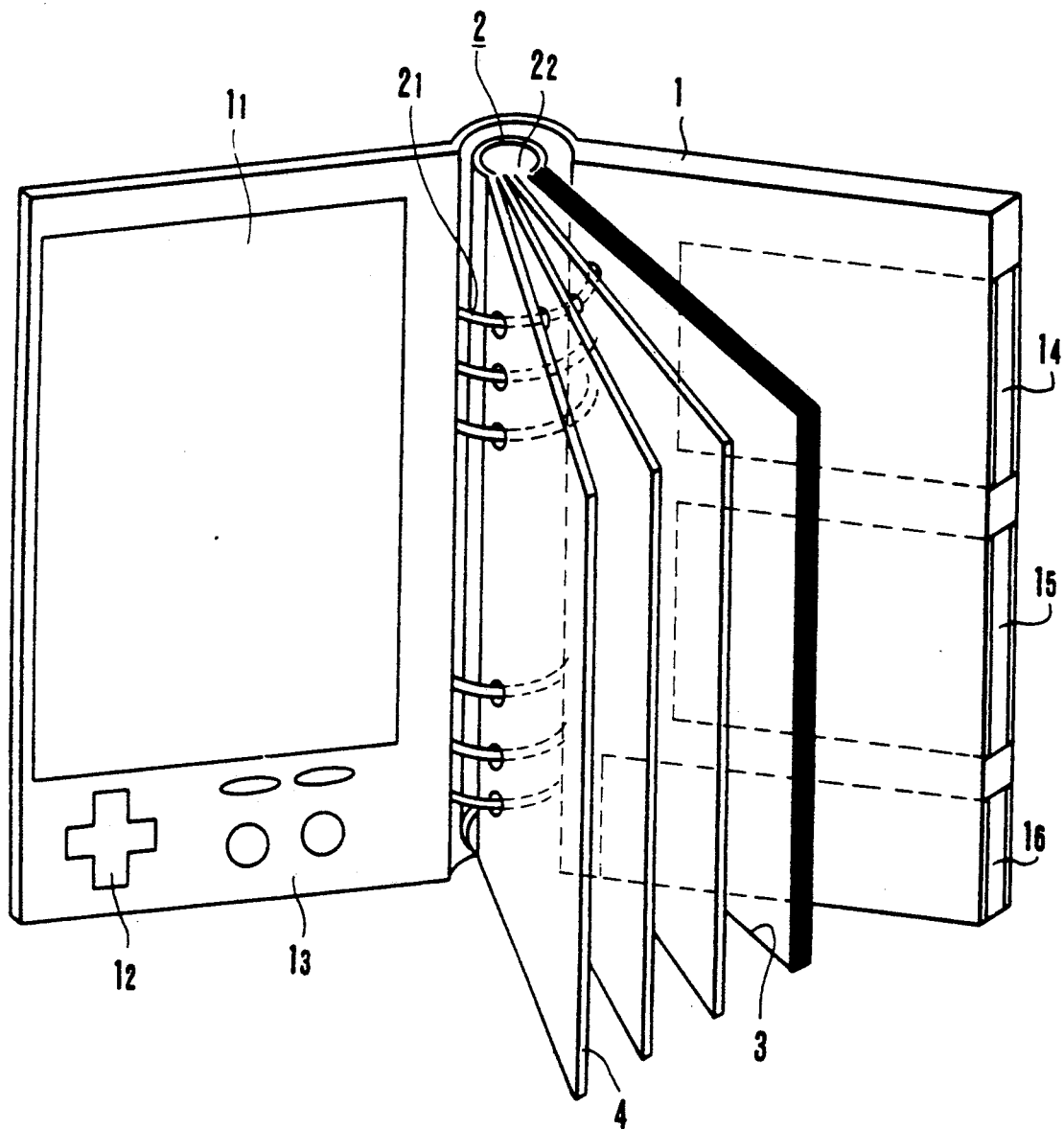
FIG. 1 is a perspective view showing an embodiment of the present invention.

FIG. 1 shows an electronic system pocketbook apparatus according to an embodiment of the present invention. Referring to FIG. 1, reference numeral 1 denotes a portable electronic, system pocketbook main body having a foldable structure composed of left and right portions connected together by a spine portion; $1_1$, a display unit; $1_2$, a cursor key; $1_3$, function keys; $1_4$ and $1_5$, IC cards; and $1_6$, a power source. The main body 1 has an internal CPU (not shown) and processing function units in both its left and right portions for performing necessary data processing.

An expansion card holder 2 is constituted by rings $2_1$ for holding an expansion card 4 and/or recording paper 3 and an opening/closing metal piece $2_2$ for opening/closing the rings $2_1$. That is, the expansion card holder 2 also holds the recording paper 3. Transmission/reception of necessary data between the expansion card 4 and the main body 1 is performed by a communicating means (to be described later).

Figure 3:
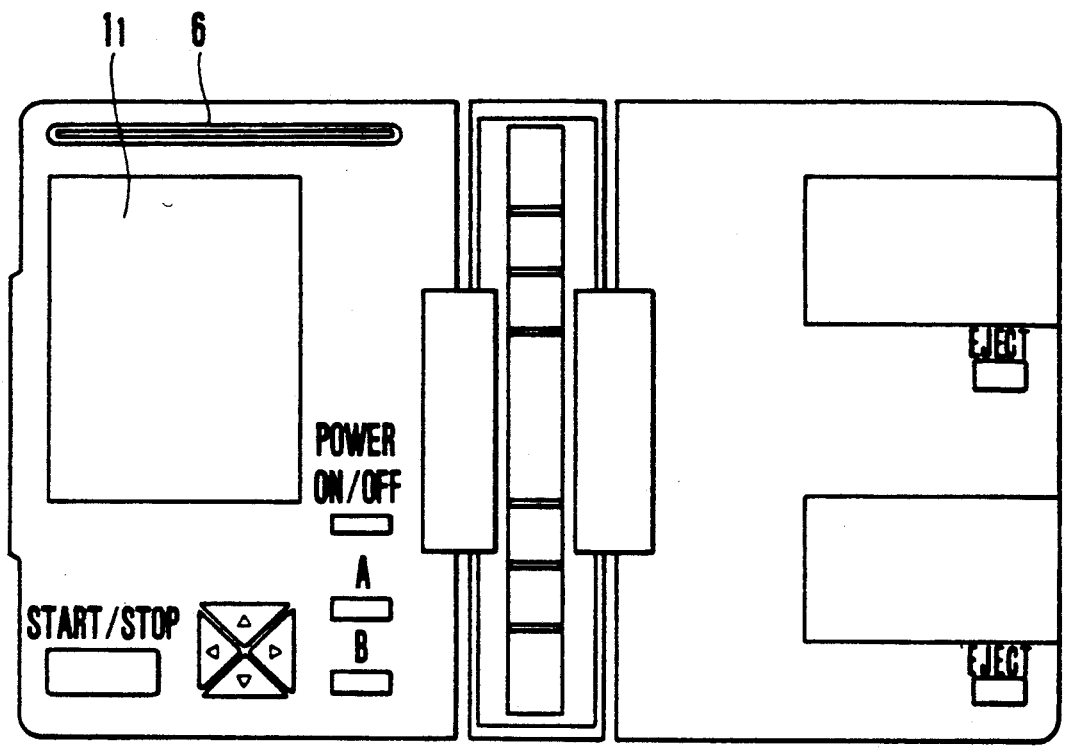
FIG. 3 is a view showing a method of housing an information input means.

In the apparatus having the above arrangement, data is normally input by an input means such as keys provided on the expansion card 4. If, however, data must be input by handwriting, a user can write necessary characters with a pen on the display unit $1_1$ to perform handwriting input. For this purpose, as shown in FIG. 2(a), the display unit $1_1$ has a pressure sensor 5 on which a user can write necessary characters or graphic patterns with a pen 6. The pen 6 consists of a hard material such as plastic and is formed to have a thin distal end and a thick rear end as shown in FIG. 2(c). When the thin portion of the pen 6 is used to write necessary information on a screen as shown in FIG. 2(a), an output is generated from only a narrow portion of the pressure sensor as indicated by a symbol $l_1$ in FIG. 2(a). When the thick portion of the pen 6 is used to input necessary information as shown in FIG. 2(b), an output is generated from a wide portion as indicated by symbol $l_2$ in FIG. 2(b). Therefore, by programming the apparatus such that information is written when an output is generated from a narrow portion and written information is erased when an output is generated from a wide portion, switching between information writing and erasing functions can be performed without a troublesome operation of, e.g., manipulating a switch. The pen 6 may have two ends having the same thickness as shown in FIG. 2(d). In this case, a soft member $6_1$ such as rubber, for example, is attached to the rear end of the pen 6. When the screen is pressed by a hard portion of the pen 6, an output signal is generated from a narrow portion of pressure sensor 5. When the screen is pressed by the soft portion $6_1$, however, an output signal is generated from a wide portion of pressure sensor 5 since the soft portion is distorted. As a result, information writing and erasing operations can be distinguished from each other as described above. With this arrangement, a user can write and erase information as if he or she were using a normal eraser. The pen 6 is preferably housed in an upper portion of the display unit $1_1$ as shown in FIG. 3 for the sake of convenience in use. The distal end shape of the pen may be changed as shown in FIGS. 2(e) to 2(g). When the screen is pressed by the pen, the distal end shape of the pen is detected to determine a processing command. In addition, as shown in FIG. 2(h), the pen may be modified such that its sharp distal end is used to perform writing and erasing and its side wall s of a flat shape is used to perform switching between writing and erasing modes. This switching may be realized by using a switch.

Figure 4:
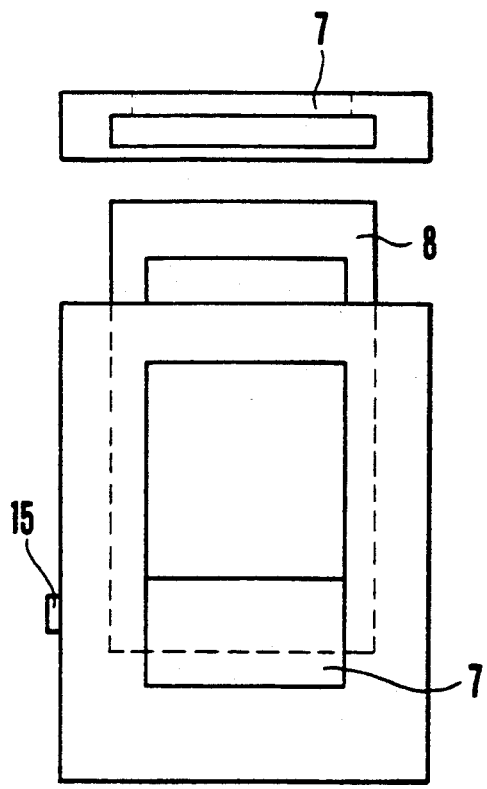
FIG. 4 is a view showing an inserting/removing structure of an LCD.

The display unit $1_1$ can display a plurality of keys on its display screen and detect a coordinate point of a touched portion to determine that a key corresponding to the portion is manipulated. In this case, the surface of the display unit $1_1$ may comprise a pressure sensor as shown in FIGS. 2(a) and 2(b) or a touch panel as shown in FIG. 4. FIG. 4 shows a structure in which a touch panel 7 is used as the display unit $1_1$ and a liquid crystal display (to be referred to as an LCD hereinafter) 8 can be inserted in/removed from the touch panel 7. In this manner, a user can use an economical LCD at the beginning and later on replace the economical LCD with an LCD which is expensive but has high resolution, if necessary. Referring to FIG. 4, reference numeral 15 denotes a lever for unlocking a mechanical lock in order to remove the LCD 8. Although a display using an LCD can be seen in a bright place, it is difficult to see the display in a dark place. In this case, as shown in FIG. 5(a), a light-emitting member such as an EL 9 is placed below the LCD 8 so that display visibility is improved by light emitted by the EL 9. The EL 9 receives a voltage via an electrode 12 in contact with an electrode 11 at the display side and emits light. Since, however, a considerable amount of power is consumed upon light emission, a reflecting plate 10 may be adhered on the rear side of the EL 9 so that the member (an auxiliary display 13 obtained by adhering the EL 9 and the reflecting plate 10) can be turned over when light emission is not necessary. FIG. 5(b) shows the auxiliary display 13 in detail, and FIG. 5(c) shows the LCD 8 in detail. Referring to FIG. 5(c), power is supplied from an electrode 14 at the main body side via an electrode $8_1$ of the LCD. Note that a recess portion $8_2$ is formed in the LCD 8 to receive the reflecting plate 10 when the auxiliary display 13 is turned over.

Figure 8:
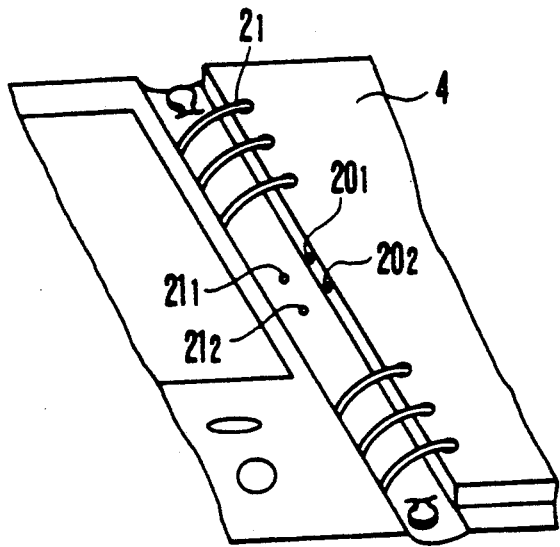
Figure 9:
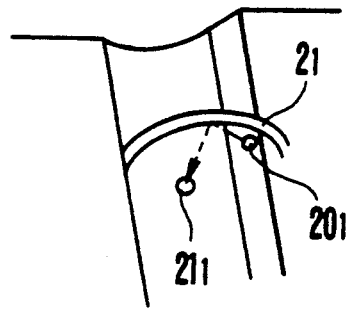
Figure 10:
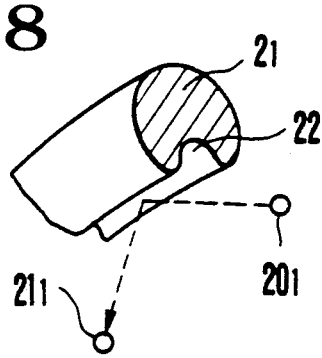
Figure 11:
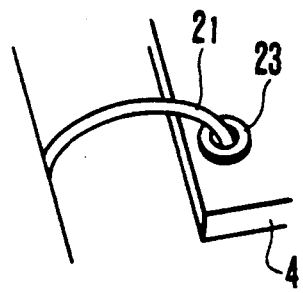

In order to use an expansion card, signal exchange must be performed between the card and the main body. FIG. 6 shows a communication means for performing this signal exchange. Referring to FIG. 6, an optical connector $18_1$ provided at the distal end of an optical fiber cable 18 connected to the expansion card 4 is fitted in a connector $18_2$ at the main body side. Although only one optical fiber cable is shown in FIG. 6, two cables may be used to perform full-duplex communication. FIG. 7 shows another communication means in which cores $19_1$ and $19_2$ are provided to the expansion card 4 so as to be perpendicular to the rings $2_1$ for holding the expansion card and cores $19_3$ and $19_4$ are provided at the main body side. With this arrangement, communication can be performed by an electromagnetic induction effect obtained via the rings $2_1$ without using any special connection. FIG. 8 shows a means in which light-emitting diodes $20_1$ and $21_2$ are provided at the expansion card 4 side and light-receiving diodes $20_2$ and $21_1$ are provided at the main body side, thereby performing signal transmission by optical communication between the light-emitting and light-receiving diodes. In this arrangement, although the optical axes of the light-emitting and light-receiving diodes do not oppose each other, communication can be performed by scattered light since the distance is short. Since, however, a transmission efficiency of this means is not so high, a means shown in FIG. 9 is more advantageous in order to increase the efficiency. Referring, to FIG. 9, light emitted from a light-emitting diode 20 is reflected by a ring $2_1$ and the reflected light is guided to a light-receiving diode $21_1$. In addition, as illustrated by a sectional view of a ring shown in FIG. 10, the transmission efficiency can be further increased by forming a recess-like groove 22 in the inner surface of the ring $2_1$ so as to efficiently reflect light. FIG. 11 shows a method using electromagnetic induction. In the method shown in FIG. 11, not a magnetic flux but a current is flowed to the ring $2_1$, and a coil 23 is provided at the expansion card 4 side, thereby coupling the coil and ring by electromagnetic induction.

Figure 12A:
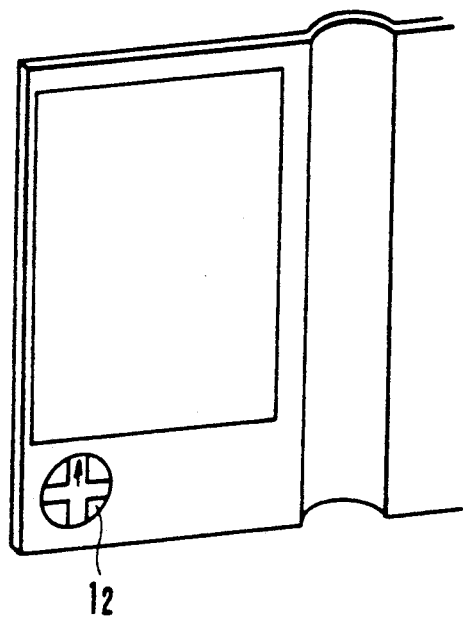
FIGS. 12(a), 12(b), and 13 are views each showing a state in which the direction of a cursor pad is physically changed.
Figure 12B:
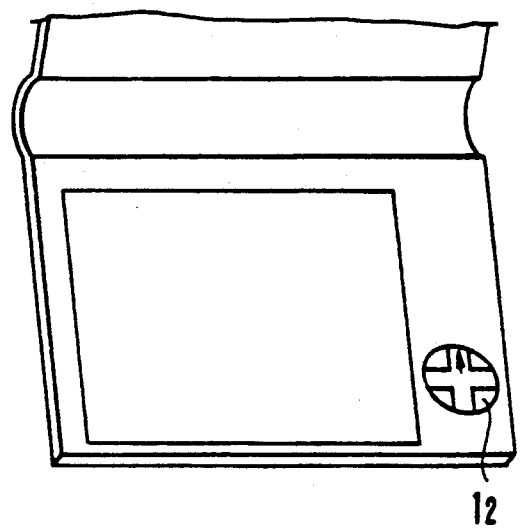
Figure 13:
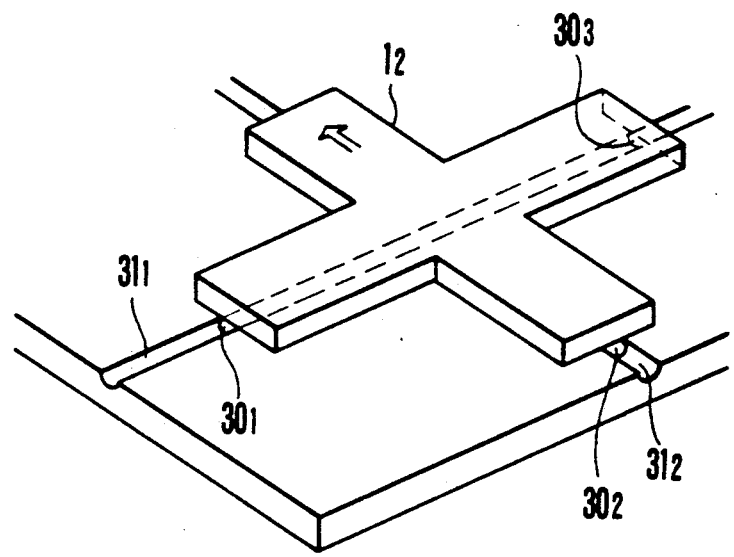

FIGS. 12(a) and 12(b) are views for explaining a method of mechanically rotating the cursor key pad $1_2$ to cope with a display direction change. In this method, the cursor key pad located at a position shown in FIG. 12(a) is moved along a cursor moving direction as shown in FIG. 12(b). With this arrangement, since the upper portion of the cursor key always indicates the upper portion of the screen, a user does not feel inconvenience upon operation. FIG. 13 shows another method of rotating the cursor key pad, in which projections $30_1$ to $30_4$ ($30_4$ is not shown in FIG. 13) are engaged with grooves $31_1$ and $31_2$ to rotate the cursor key pad.

Figures 14A, 14B:
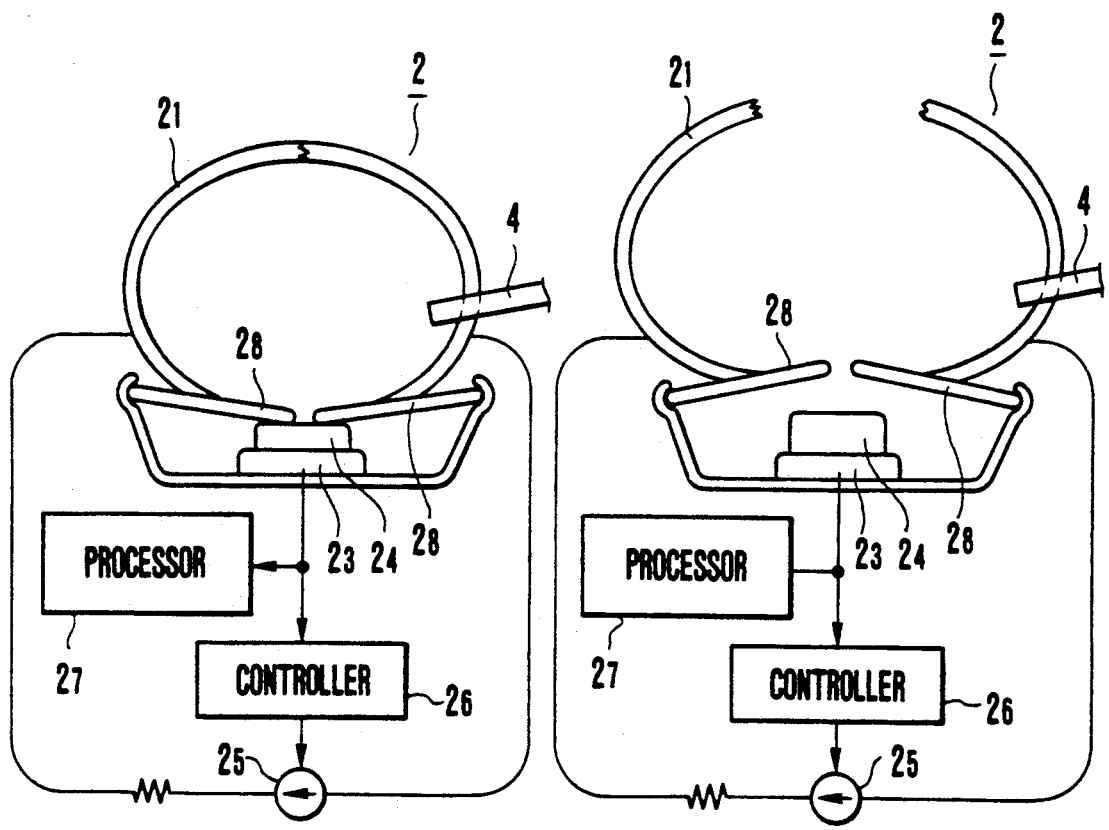
FIGS. 14(a) and 14(b) are block diagrams showing a circuit for stopping supply of power when an expansion card holder is opened.

FIGS. 14(a) and 14(b) show a side view of the expansion card holder 2 (the expansion card holder shown in FIG. 1 viewed from above) associated with the arrangement shown in FIG. 11 for performing communication between the main body and the expansion card. FIG. 14(a) shows the ring $2_1$ in a closed state, and FIG. 14(b) shows the ring $2_1$ in a closing released state, i.e., in an open state. The ring $2_1$ is mounted on a mounting plate $2_8$. When the ring $2_1$ is closed, a projection $2_4$ of a switch $2_3$ is urged against the mounting plate $2_8$ to turn on the switch $2_3$ as shown in FIG. 14(a). When the ring $2_1$ is opened as shown in FIG. 14(b), urging of the projection $2_4$ is released to turn off the switch $2_3$.

The expansion card 4 receives a current for communication from a constant current source $2_5$ provided at the main body side via the ring $2_1$. Therefore, when the ring $2_1$ is opened as shown in FIG. 14(b), a voltage at the open end of the ring may rise to give a shock to a finger or the like of a user. Therefore, a controller $2_6$ detects the open state of the ring $2_1$ in accordance with the state of the switch $2_3$ to stop the operation of the constant current source $2_5$.

Since communication is performed between the main body and the expansion card via the ring $2_1$, communication for the expansion card performed via the ring $2_1$ is interrupted when the ring $2_1$ is opened. If this state is kept unchanged, a timing difference is produced between processing performed at the main body side and processing performed at the expansion card. In order to prevent such an inconvenience, according to the present invention, when the switch $2_3$ is turned off, both of a processor $2_7$ at the main body side and a processor at the expansion card side stop their operations.

In this manner, after the ring $2_1$ is opened, data processing operations at both the main body and expansion card sides are stopped, and communication between the main body and the expansion card is also stopped. If, however, the ring $2_1$ is closed, communication is restarted, and the stopped data processing is also restarted.

Figure 15:
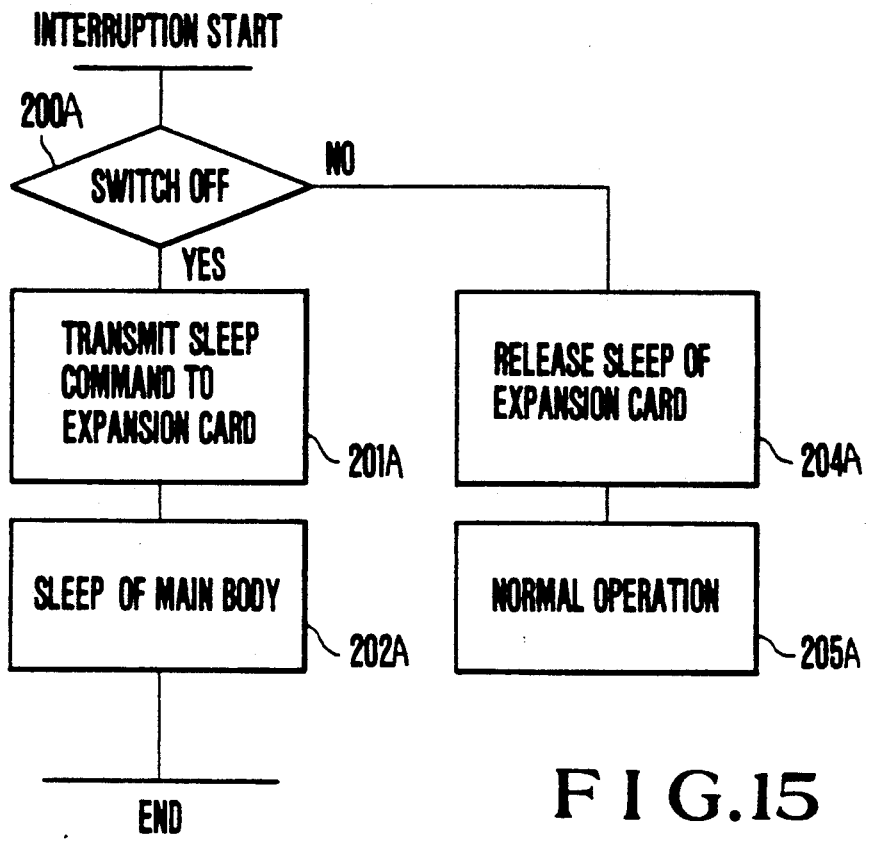
FIG. 15 is a flow chart for explaining an operation of the circuit shown in FIGS. 14(a) and 14(b)

Since, however, the expansion card cannot directly use an open/close signal from the switch $2_3$, control is performed by a method as shown in FIG. 15.

That is, when the state of the switch $2_3$ changes, a signal indicating the change is transmitted to the CPU at the main body side to set the CPU in an interruption state. If the CPU determines in step 200A that the switch $2_3$ is turned off by this interruption, the CPU generates a sleep command for stopping the operation at the expansion card side as shown in step 201A. As a result, the command is transmitted to the expansion card 4 to set the expansion card 4 in a sleep state, thereby stopping communication and the data processing. Meanwhile, in order to prepare for an operation to be performed when the power source is switched on next, the main body side stores states of the respective sections and starts a sleep state in step 202A, thereby stopping communication and the operation. In this manner, a power consumption can be largely reduced by setting the sleep state. Note that the sleep state is an operation in which a clock signal is stopped to stop the operation of the CPU.

When the ring $2_1$ is closed and a clock signal is generated accordingly, an operation is restarted from the start timing in the interruption state shown in FIG. 15. The CPU determines an ON state of the switch $2_3$ in step 200A and transmits a sleep release command to the expansion card side in step 204A. As a result, the operation from the timing at which the operation is stopped is restarted to perform a normal operation (step 205A).

When the ring $2_1$ is opened while the expansion card receives power supply from the main body, the expansion card stops its operation (step 201A) since the power is no longer supplied to the expansion card. In this state, however, the main body continues its operation since power is supplied to circuits at the main body side. Therefore, if this state is kept unchanged, a timing difference is produced between processing at the main body side and that at the expansion card side. In order to prevent such an inconvenience, according to the present invention, when the switch $2_3$ is turned off, the operation of the processor $2_7$ at the main body side is stopped on the basis of a signal indicating the OFF state of the switch $2_3$ (step 202A). As a result, data processing is stopped from the timing at which the ring $2_1$ is opened, and communication between the main body and the expansion card is also stopped.

When the ring $2_1$ is closed, however, power is supplied to the expansion card, and the stopped data processing is restarted (step 204A).

Figures 16, 17:
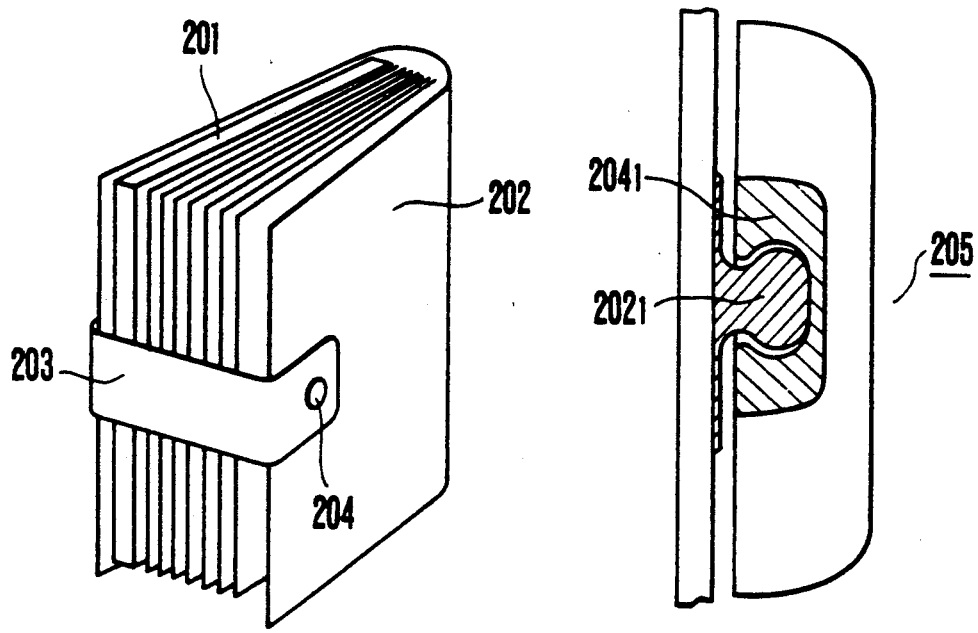
FIG. 16 is a perspective view showing a state in which a cover clip is closed.
FIG. 17 is a sectional view showing a structure for using the cover clip as a switch.

FIG. 16 shows an apparatus in which a power source operates when a cover is opened. Referring to FIG. 16, reference numeral 201 denotes a data processor; 202, a cover of a pocket book; and 203, a cover clip 203 for closing the cover 202 when the pocketbook is not used. The cover clip 203 can be fastened by a cover fastening button 204. As shown in FIG. 17, for example, an engaging portion $204_1$ is formed inside the cover fastening button 204 and engaged with a projecting portion $202_1$ formed at the cover 202 side, thereby fastening the cover. The projecting portion $202_1$ and the engaging portion $204_1$ are made of a conductive material to form a cover switch 205. When the projecting portion $202_1$ and the engaging portion $204_1$ are engaged with each other, an ON signal representing the engagement is transmitted from the cover switch 205 to the data processor. Therefore, in this arrangement, an operation signal representing that the cover clip 203 is unfastened is output as an OFF signal of the cover switch 205 when the projecting portion $202_1$ and the engaging portion $204_1$ are disengaged from each other.

Figure 18:
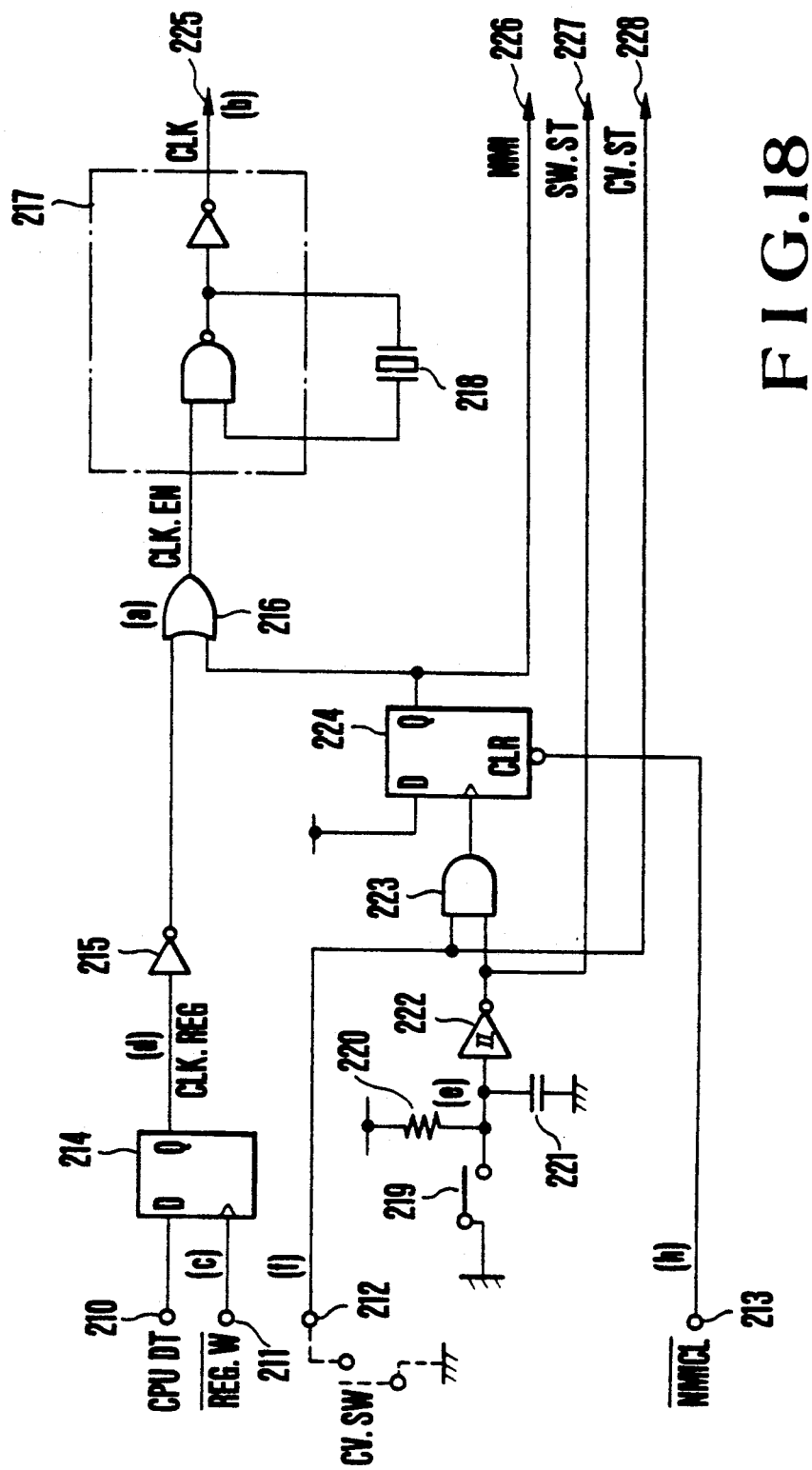
FIG. 18 is a circuit diagram showing a circuit for controlling a clock oscillator by an ON/OFF operation of the cover clip.
Figure 19:
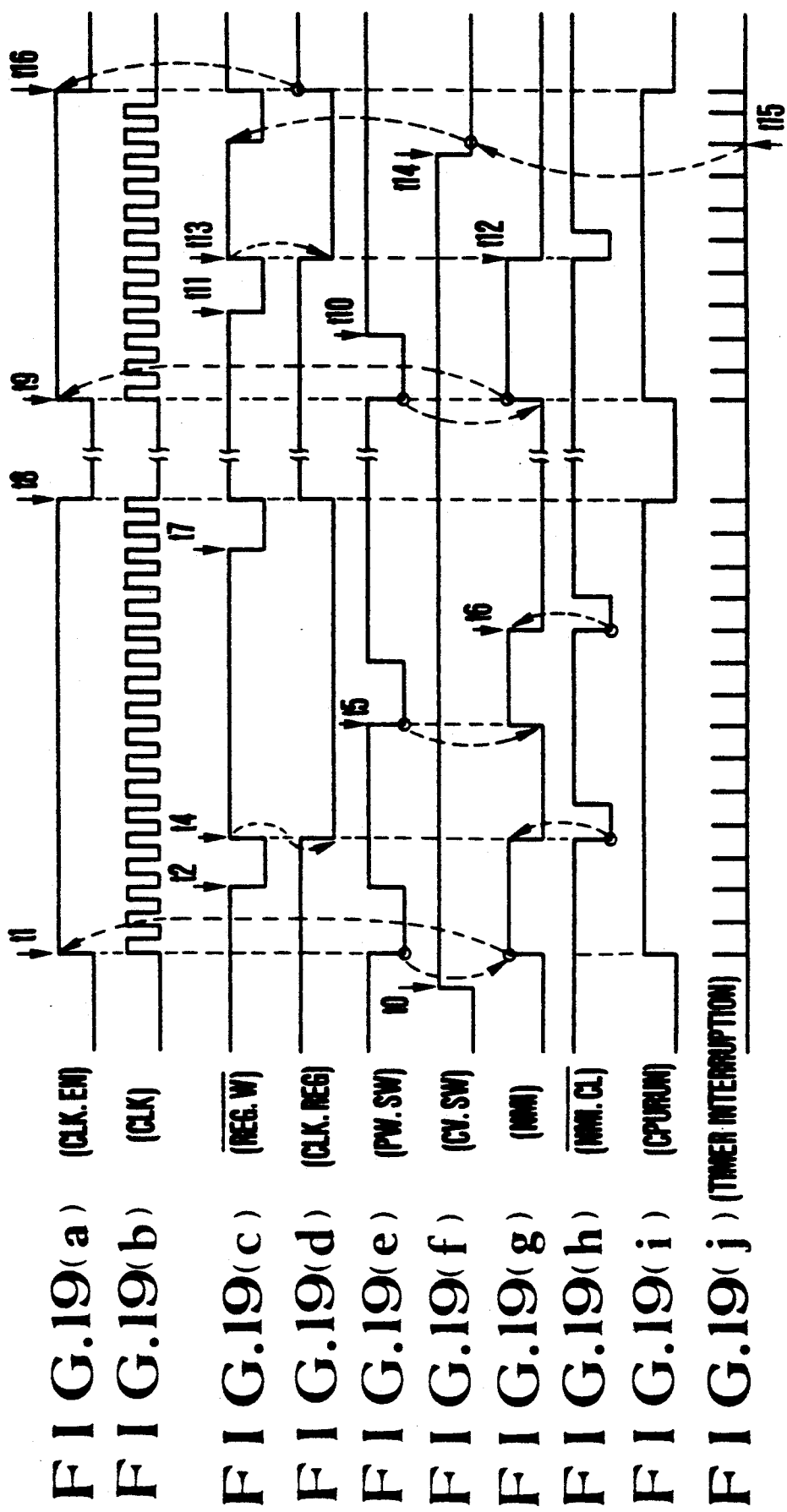
FIGS. 19(a) to 19(j) are timing charts for explaining an operation of the circuit shown in FIG. 18.

FIG. 18 shows a clock signal transmitter for transmitting a clock signal when the operation signal is output from the cover switch 205, and FIGS. 19(a) to 19(j) show signal waveforms of the respective sections of the transmitter. The state of the cover switch is periodically monitored during an operation of a CPU (not shown) by software interruption. First, when the cover switch (represented by CV.SW in FIGS. 18 and 19(f)) is opened at a timing t0 as shown in FIG. 19(f), the ground potential supplied to a terminal 212 is stopped, and the terminal 212 goes to level "1". This signal is supplied as a CV.ST signal to a terminal 228 and periodically monitored by the CPU. When a power switch 219 is depressed at a timing t1, the ground potential is supplied to the input terminal of an inverter 222, a signal of the inverter 222 goes to level "0" as shown in FIG. 19(e). Therefore, since both input terminals of an AND gate 223 go to level "1", a flip-flop 224 fetches a signal of level "1" from the D input terminal and outputs the signal of level "1" from the Q output terminal. As a result, a signal shown in FIG. 19(g) is output from an NMI (non maskable interrupt) terminal 226. Since this NMI signal is also supplied to an oscillator 217 via an OR gate 216, the oscillator 217 is set in a clock enable (CLK.EN) state as shown in FIG. 19(a) to generate a clock signal CLK having a frequency determined by an oscillating member 218. Therefore, a clock (CLK) signal is output from a terminal 225 as shown in FIG. 19(b).

At the same time the clock is supplied to cause the CPU to start its operation, interruption is generated by the signal NMI, and software recognizes that the cover is opened and a normal operation can be started. As a result, at a timing t2, the CPU (not shown) supplies a write signal $\overline{REG.W}$ shown in FIG. 19(c) to a terminal 211 and data signal CPU.DT to a terminal 210. The data signal CPU.DT of level "0" is supplied in order to generate the clock signal, and that of level "1" is supplied in order to stop the clock signal to set a sleep state. Since a timing t4 is a timing at which the operation of the apparatus is started, the clock signal must be intermittently generated. Therefore, the data CPU.DT is at level "0". For this reason, as shown in FIG. 19(d), a signal CLK.REG of level "0" is output from the Q terminal of the flip-flop 214. This CLK.REG signal is supplied to the oscillator 217 via the OR gate 216.

Since the CPU supplies a signal $\overline{NMI.CL}$ to a terminal 213 at a timing t4 as shown in FIG. 19(h), the signal NMI supplied from the flip-flop 224 goes to level "0" as shown in FIG. 19(g). Therefore, the oscillator 217 operates by only the signal CLK.REG supplied from the flip-flop 214.

When a power switch 219 is depressed in order to stop the apparatus operation at a timing t5, a signal of level "0" shown in FIG. 19(e) is supplied to the inverter 222, and a signal of level "1" is supplied to the flip-flop 224. Therefore, the signal NMI shown in FIG. 19(g) is supplied from a terminal 226. This NMI signal is supplied from the terminal 226 to the CPU. After the NMI interruption processing routine clears the NMI by the signal $\overline{NMI.CL}$ signal, the signal $\overline{REG.W}$ shown in FIG. 19(c) is supplied to the terminal 211 at a timing t7; and a signal of level "1" is supplied to the terminal 210. Therefore, since the flip-flop 224 fetches the signal of level "1" and outputs it from the Q terminal, the signal CLK.REG shown in FIG. 19(d) is supplied to the oscillator 217 via the OR gate 216. Since the signal NMI is not generated at a timing t8, the signal CLK.EN goes to level "0", thereby stopping the operation of the oscillator 217 and generation of the clock signal. Therefore, the signal CLK shown in FIG. 19(b) supplied from the terminal 225 is no longer supplied. When the clock signal is stopped as described above, the CPU stops its operation to reduce power consumption.

When the power switch 219 is depressed again at a timing t9, the clock signal is generated as described above. When the cover switch is closed at a timing t14, closing of the cover switch is detected at a timing t15 as a monitor timing since the state of the cover switch is periodically monitored by software interruption of the CPU as shown in FIG. 19(i). This detection result is supplied as a signal CV.ST from the terminal 228 to the CPU. Therefore, since the CPU supplies the signal $\overline{REG.W}$ to the terminal 211 and a signal of level "1" to the terminal 210, the signal CLK.REG goes to level "1" as shown in FIG. 19(d) to stop the clock signal. That is, the clock signal is stopped not only when the operation of the apparatus is stopped by the power switch but also when the cover switch is closed during the operation, thereby reducing the power consumption. Therefore, even if the power switch 219 is accidentally turned on while the apparatus is carried by a user, no clock is supplied to the CPU so as not to unnecessarily consume the power.

Figure 20:
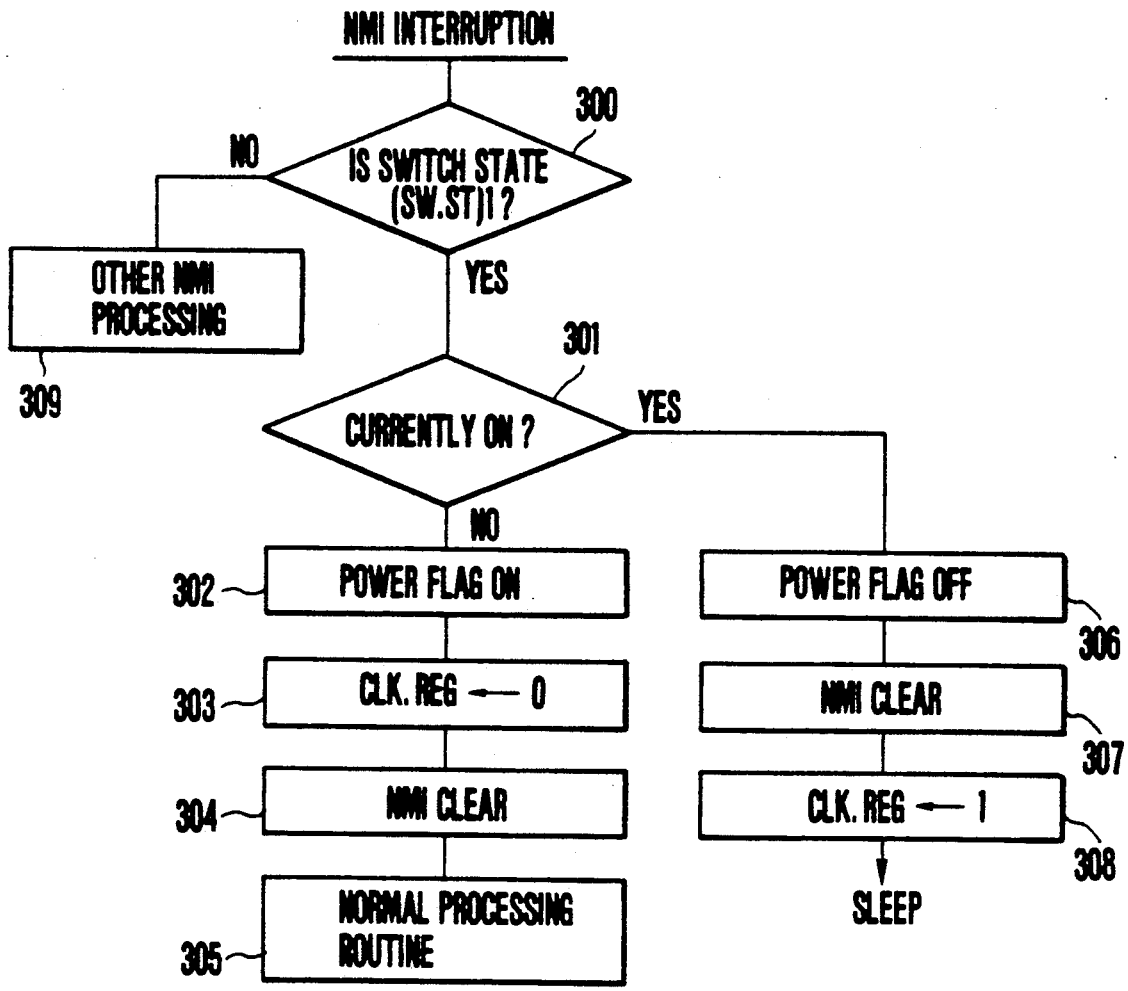
FIGS. 20 and 21 are flow charts for explaining operations of the circuit shown in FIG. 18.
Figure 21:
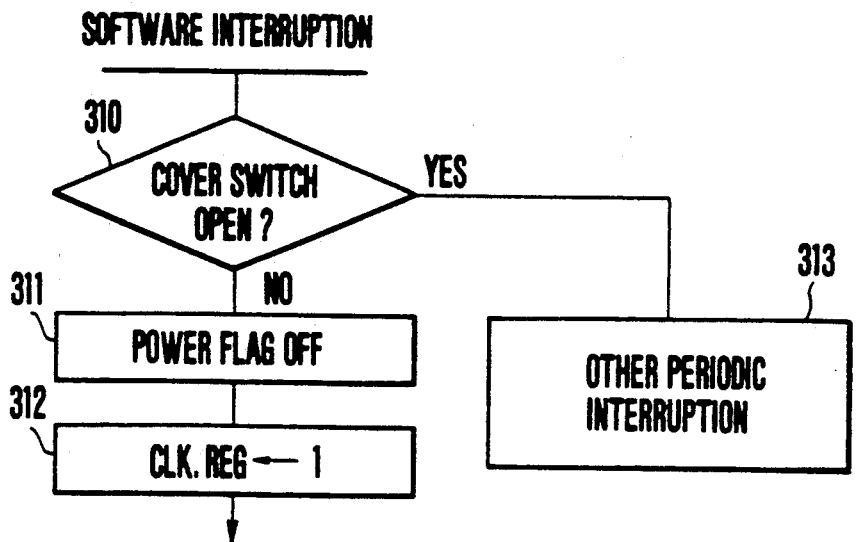

FIGS. 20 and 21 show flow charts of operations of the CPU. NMI interruption processing shown in FIG. 20 is performed each time the signal NMI is generated. Referring to FIG. 20, if the CPU determines in step 300 that the switch state, i.e., SW.ST of the terminal 227 is at level "1", the CPU checks in step 301 whether currently ON, i.e., whether the power source is switched on for the first time. Since "NO" is determined in an initial state, power flag ON processing, processing for switching the signal CLK.REG to level "0", and NMI clear processing are performed in steps 302 to 304, and the flow returns to a normal processing routine in step 305.

When the power source is switched on, i.e., when the clock signal is generated, power flag OFF processing, NMI clear processing, and processing for switching the signal CLK.REG to level "1" are performed in steps 306 to 308. If the switch state is not 1 in step 300, other NMI processing is performed in step 309.

FIG. 21 shows software interruption processing. Referring to FIG. 21, in step 310, whether the cover switch is open is monitored by software interruption. If the cover switch is not open, power flag OFF processing and processing for switching the signal CLK.REG to level "1" are performed in steps 311 and 312. If the cover switch is open, other periodic interruption is performed in step 313.

FIGS. 22 and 23 are circuit diagrams showing other embodiments of the present invention, in which control for generating or stopping a clock signal is not performed but a power source current is directly controlled. In this case, a main body switch 161 and a cover switch 135 must be normally ON. That is, once the main body switch 161 or the cover switch 135 is set in an ON or OFF state, it must be continuously in the ON or OFF state until the state changes next. Referring to FIG. 22, the power switch 161 of the main body and the cover switch 135 are connected in series with each other, and a current is supplied from a battery 160 to a load 162 when both the switches are closed. Referring to FIG. 23, when the cover switch 135 is turned on, a signal of level "1" is supplied from the battery 160 to a buffer 164 via a resistor 163, thereby turning on a transistor 165. Therefore, when a power switch 161 (a power source switch at the main body side) is in an ON state, a transistor 166 is also in an ON state to supply a current to the load 162.

Figure 24B:
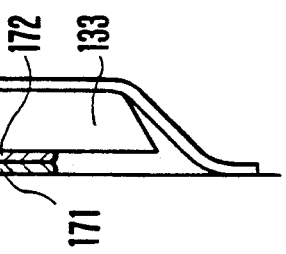
Figure 24A:
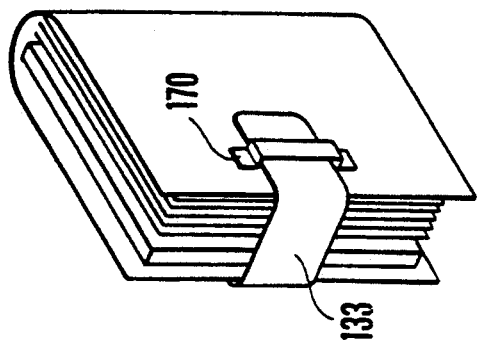

FIGS. 24(a) and 24(b) show another embodiment of the cover switch, in which a cover clip 133 is fastened by a clip fastener 170. When the cover clip 133 is fastened by the clip fastener 170, contacts 171 and 172 are brought into contact with each other.

Figure 25B:
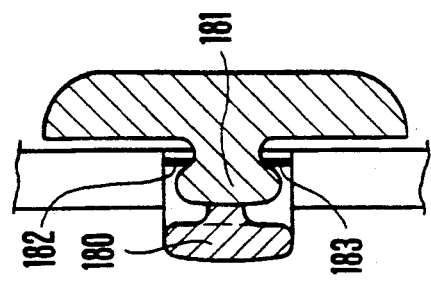
FIGS. 24(a), 24(b), 25(a), and 25(b) are perspective view and sectional views, respectively, each showing a structure for using the cover clip as a switch.
Figure 25A:
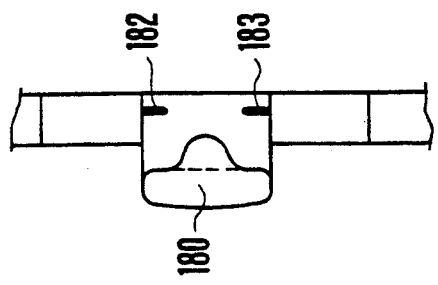

FIGS. 25(a) and 25(b) show still another embodiment of the cover switch comprising a push button switch 180 at the cover side. When a cover clip 133 is open, the push button switch 180 is in a state shown in FIG. 25(a). When the cover clip 133 is closed, the push button switch 180 is pushed and turned on by a projecting portion 181. At this time, the projecting portion 181 is engaged with engaging pins 182 and 183 so as not to be removed.

Figure 26:
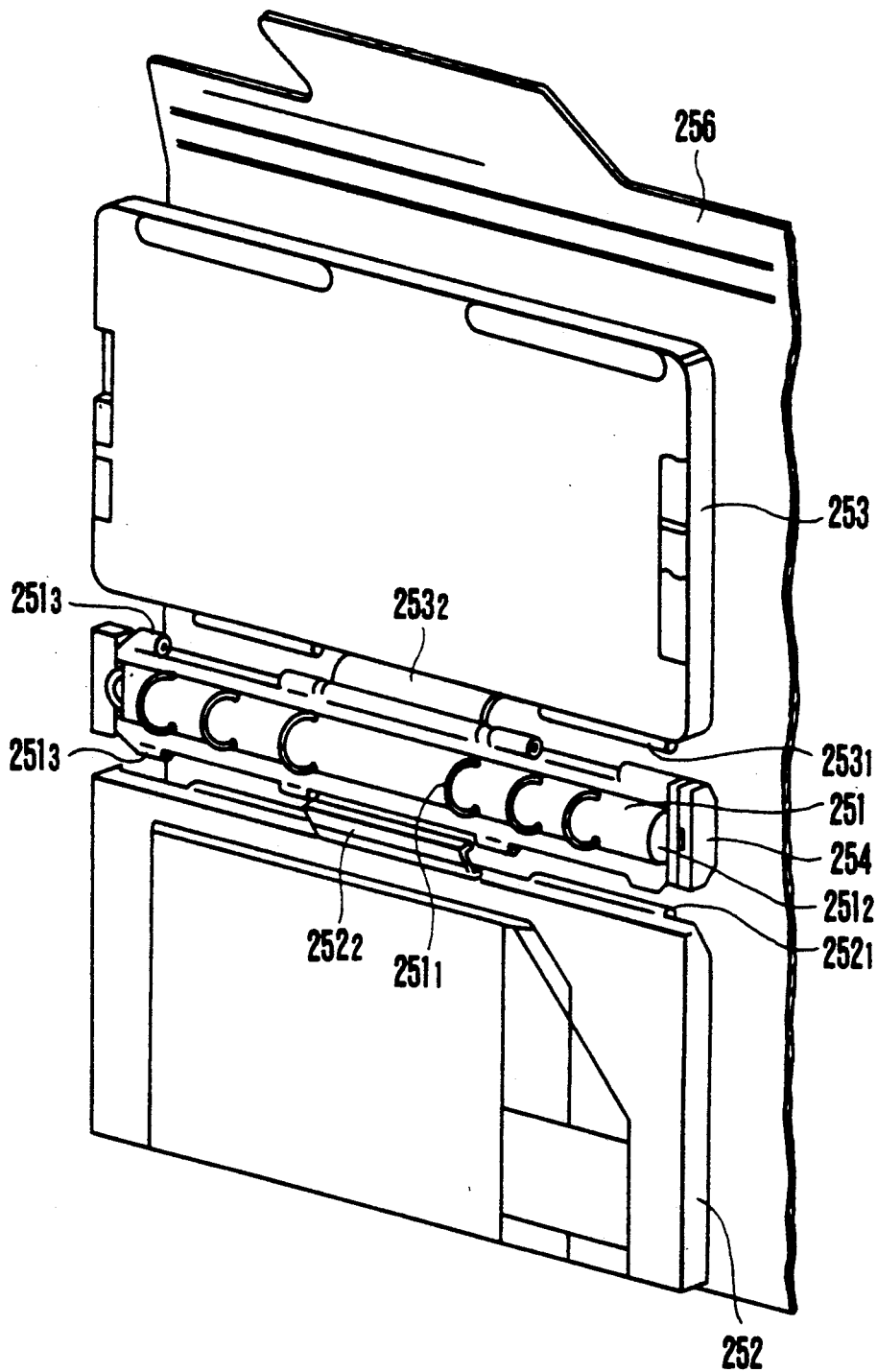
FIG. 26 is a perspective view showing a structure for housing batteries in a lower space of the expansion card holder.

FIG. 26 shows an embodiment of the present invention. Referring to FIG. 26, reference numeral 251 is an expansion card holder having rings $251_1$ for holding paper and a releasing metal piece $251_2$ for opening the rings $251_1$. Engaging portions $251_3$ are formed at two ends in the longitudinal direction of the expansion card holder 251. The engaging portions $251_3$ are engaged with portions $252_1$ and $253_1$ to be engaged of electronic processors 252 and 253, respectively, thereby pivotally engaging the electronic processors 252 and 253.

Figure 27:
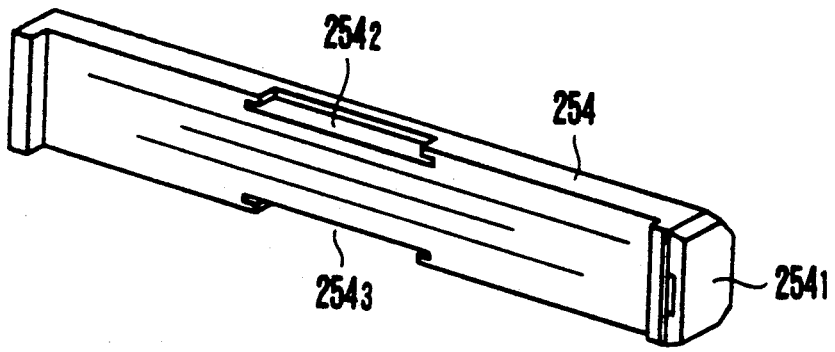
FIG. 27 is a perspective view showing a battery holder.
Figure 28:
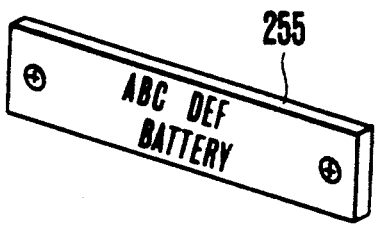
FIG. 28 is a perspective view of a battery.

A battery holder 254 is fitted in the rear surface of the expansion card holder 251. FIG. 27 shows the battery holder 254 in detail. Referring to FIG. 27, a cover $254_1$ can be opened to replace a battery in the holder 254. FIG. 28 shows a battery 255 to be used in this apparatus. Connectors $254_2$ and $254_3$ having a predetermined number of electrodes are formed at two end portions in the longitudinal direction on a fitting surface, i.e., at the expansion card holder side of the battery holder 254 and electrically connected to connectors $252_2$ and $253_2$ of the electronic processors 252 and 253, respectively.

Referring to FIG. 26, the expansion card holder 251 is fitted in the connectors $254_2$ and $254_3$ of the battery holder 254 and is fitted in the battery holder 254. The portions $252_1$ and $253_1$ to be engaged of the electronic processors 252 and 253, respectively, are engaged with the engaging portion $251_3$ of the expansion card holder 251 so as to be pivoted, i.e., opened/closed. A soft cover 256 is detachably mounted on the rear surface of the battery holder 254.

The electronic processor 252 has data input keys, and the electronic processor 253 has a CPU, a RAM, and a ROM and mounts an expansion card or the like as needed.

Figure 29:
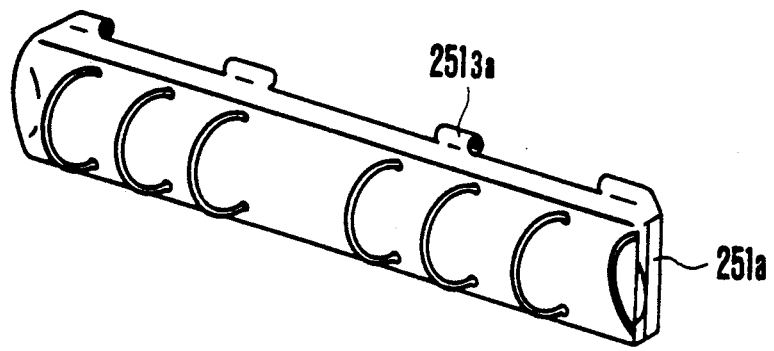
FIG. 29 is a perspective view of the expansion card holder.

In the apparatus having the above arrangement, since the battery holder 254 is detachable and fitted in the expansion card holder 251, a battery having a necessary capacity can be used. If a battery having a large capacity must be used, only the thickness of the battery holder 254 need be increased while its width is kept unchanged. In this case, although a larger cover 256 is required since the thickness of the battery holder 254 is increased, the cover 256 can be easily replaced. In addition, since the cover 256 has a degree of freedom to a certain extent, the cover 256 need not be replaced if it can house the battery holder within the range of the degree of freedom. The expansion card holder 251 can be replaced by a larger holder 251a as needed as shown in FIG. 29. This large paper holder 251a has the same width as that of the holder shown in FIG. 26. Instead, an engaging portion $251_{3a}$ is formed at the rear surface side (lower side) in contact with both end portions, and the portions $252_1$ and $253_1$ to be engaged of the electronic processors 252 and 253, respectively, are engaged with the engaging portion $251_{3a}$. Therefore, the thickness of the holder need not be increased.

Figure 30:
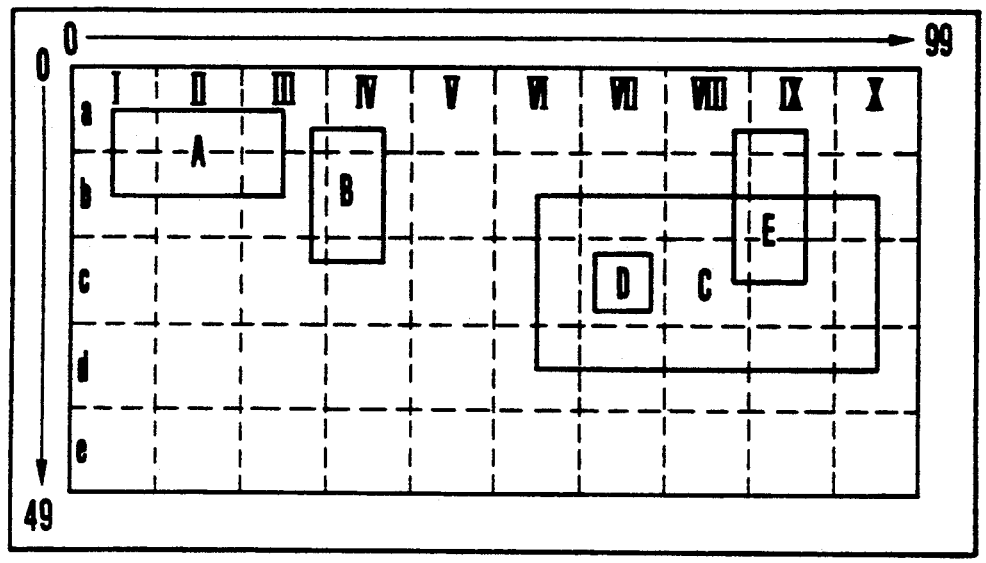
FIG. 30 is a view showing a state in which a screen is divided into a plurality of blocks.
Figure 31:
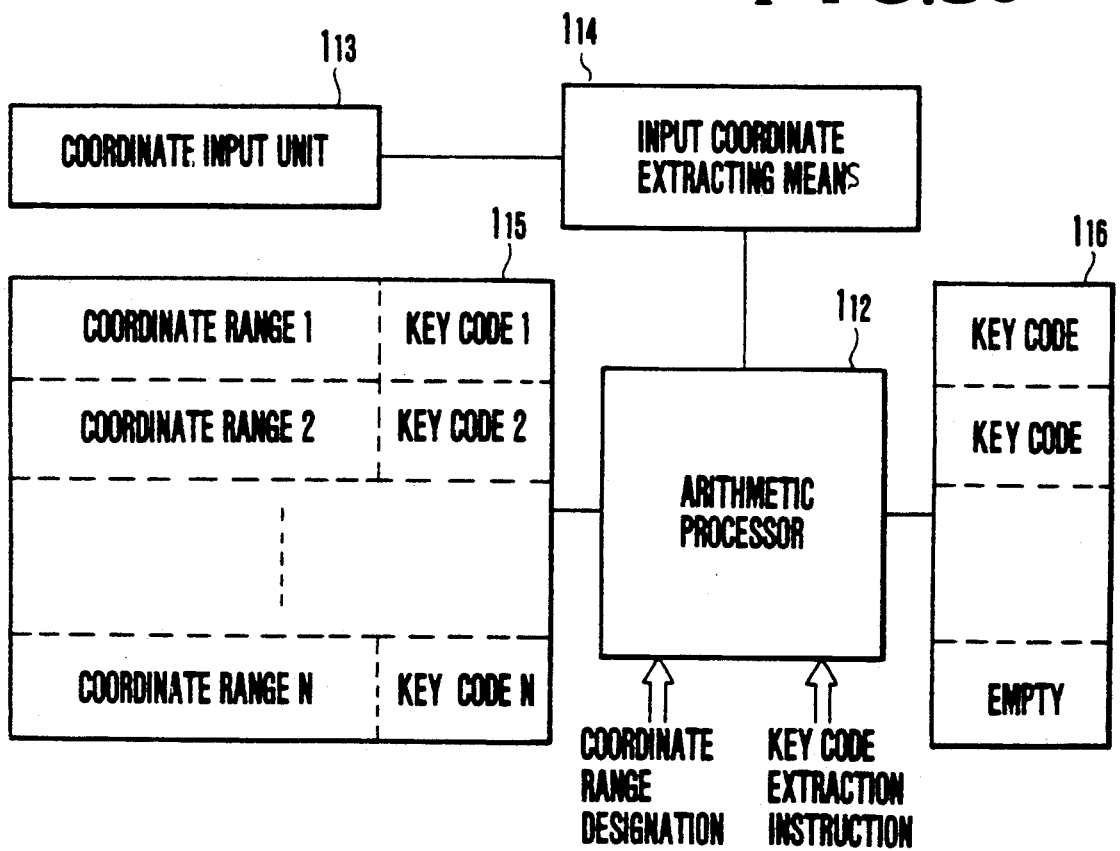
FIG. 31 is a block diagram showing a circuit used to output a touched key code.

FIG. 30 shows an embodiment of the present invention. In this embodiment, since a display unit $1_1$ is of a touch panel type, a user can select a necessary screen by touching a predetermined portion in accordance with displayed instruction. FIG. 30 shows only a part of a keyboard. If only keyboards A, B, and C are necessary as shown in FIG. 30, only the necessary portions can be displayed to facilitate an operation. In the present invention, when a keyboard is displayed on the screen, a key code corresponding to the keyboard is directly output by touching a portion corresponding to the key. FIG. 31 shows a circuit for outputting a key code. This circuit is constituted by an arithmetic processor $1_{12}$, a coordinate input unit $1_{13}$, an input coordinate extracting means $1_{14}$, a table $1_{15}$, and a memory $1_{16}$. The arithmetic processor $1_{12}$ receives a coordinate range designation signal and a key code extraction instruction.

The coordinate range designation signal is used to designate display contents to be displayed on the display unit $1_1$. For example, the signal is used to display the ranges of keys A, B, C, D, and E as shown in FIG. 30. As shown in FIG. 30, the display unit $1_1$ is divided into 50 coordinates of Ia to Xe. Since the keys are assigned assuming that each key is rectangular, the range of each key can be designated by its upper left and lower right coordinate values. The coordinates of the key A shown in FIG. 30 are (left-4, up-5) and (right-24, down-15). Although blocks can be arbitrarily defined, each block has a size of 10 in both the vertical and horizontal directions in FIG. 30. For example, the coordinates of a block IVd are (left-30, up-30) and (right-40, down-40). When a coordinate range is designated to set the keys A to E as shown in FIG. 30, two types of tables like Tables 1 and 2 below are formed.

TABLE 1

| No. | Coordinate Range | Key | Search Order |
|-----|------------------|-----|--------------|
| (1) | (4,5):(24, 15)   | A   | 5            |
| (2) | (27, 7):(36, 23) | B   | 4            |
| (3) | (54, 14):(92, 36)| C   | 3            |
| (4) | (61, 22):(68, 28)| D   | 2            |
| (5) | (77, 7):(87, 25) | E   | 1            |

TABLE 2

| Block | Registration Key | Block | Registration Key |
|-------|------------------|-------|------------------|
| Ia    | (1)              |       |                  |
| Ib    | (1)              |       |                  |
| Ic    | —                |       |                  |
| Id    | —                | VIIe  | —                |
| Ie    | —                | VIIIa | (5)              |
| IIa   | (1)              | VIIIb | (3), (5)         |
| IIb   | (1)              | VIIIc | (3), (5)         |
| IIc   | —                | VIIId | (3)              |
| IId   | —                | VIIIe | (3)              |
| IIe   | —                | IXa   | —                |

TABLE 2-continued

| Block | Registration Key | Block | Registration Key |
|---|---|---|---|
| IIIa | (1), (2) | IXb | (5) |
| IIIb | (1), (2) | IXc | (3), (5) |
| IIIc | (2) | IXd | (3), (5) |
| IIId | — | IXe | (3) |
| IIIe | — | Xa | — |
| IVa | (2) | Xb | — |
| IVb | (2) | Xc | (3) |
| IVc | (2) | Xd | (3) |
| IVd | — | Xe | — |

Registration keys are searched in the table in accordance with the depressed coordinates, and the input key is determined by comparing ranges of only the registration keys in the table. When a certain portion is depressed, only a coordinate signal in the block is output. For example, when a block VIIIb is depressed and a coordinate point (75, 18) in the block is input, the block VIIIb is determined from the coordinate value. Therefore, it is determined from Table 2 that keys (3) and (5) are registered. By comparing this data with Table 1, it is determined that a key code E does not correspond to a coordinate range but a key code C corresponds to the coordinate range. Therefore, the key code C is output. The present invention is characterized in that a coordinate signal is not output unlike in a conventional system but a key code is directly output. That is, a depressed block is checked, keys registered in the depressed block are checked, a key code to be output is determined on the basis of the data, and the determined key code is directly output. Therefore, as compared with a conventional system in which a wide area is sequentially searched to detect coordinates of a depressed portion and the coordinates are converted into a key code, a depressed portion can be determined at a high speed.

In FIG. 30, the block corresponding to the key C overlaps the keys D and E. These portions, however, may be searched in accordance with a priority order as shown in Table 1 to sequentially determine key codes.

Figure 32:
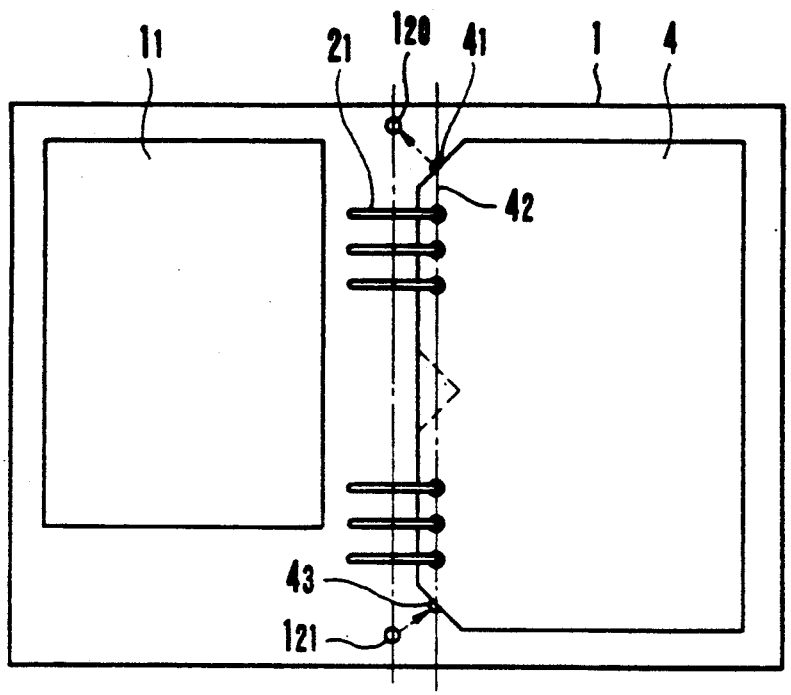
FIG. 32 is a view showing another communication method between the expansion card and the main body.

FIG. 32 shows another embodiment of the present invention. Referring to FIG. 32, upper and lower left corners of an expansion card 4 are obliquely cut, and a transmitter $4_1$ and a receiver $4_3$ are provided at portions of the cut portions corresponding to a central axis $4_2$ of expansion card holding holes. A receiver $1_{20}$ and a transmitter $1_{21}$ are mounted on portions on the central axis of a main body 1 corresponding to the transmitter $4_1$ and the receiver $4_3$, respectively. In this embodiment, the receiver $1_{20}$ and the transmitter $4_1$ at the main body side are nondirectional, and the transmitter $4_1$ and the receiver $4_3$ at the expansion card side are directional toward the receiver $1_{20}$ and the transmitter $1_{21}$, respectively.

In the apparatus having the above arrangement, the transmitter $4_1$ and the receiver $4_3$ at the expansion card side are provided on the central axis of the holding holes, and the transmitter $1_{21}$ and the receiver $1_{20}$ are provided on the central axis of the main body. Therefore, even if a play is present within an allowable range of a holder when an expansion card is held, the directivity is not easily shifted as compared with a case in which the transmitters and the receivers are provided at other portions.

Figure 33A:
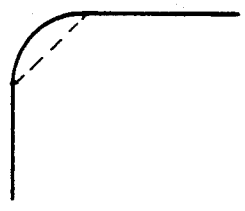
FIGS. 33(a) and 33(b) are views each showing a modification of the expansion card structure for performing the communication method shown in FIG. 32.
Figure 33B:
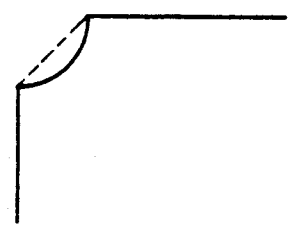

Although the upper left corner of the expansion card is cut in FIG. 32, its lower left corner may be cut. Alternatively, a V-shaped notch as indicated by a dotted line in FIG. 32 may be formed at any portion of the left side (in FIG. 32, the notch is formed substantially at the center of the left side), and a transmitter and a receiver may be provided at the notch. The transmitter or receiver portion need not be linearly formed as shown in FIG. 32. For example, the portion may be curved to form a projection as shown in FIG. 33(a). In this case, a transmission direction may be scattered to facilitate reception at the main body side. Furthermore, the portion may be curved to form a recess as shown in FIG. 33(b), thereby focusing energy with respect to a receiving element. In this case, an efficiency can be further increased by using a reflecting paint or a reflecting plate on a cut surface.

Figure 34:
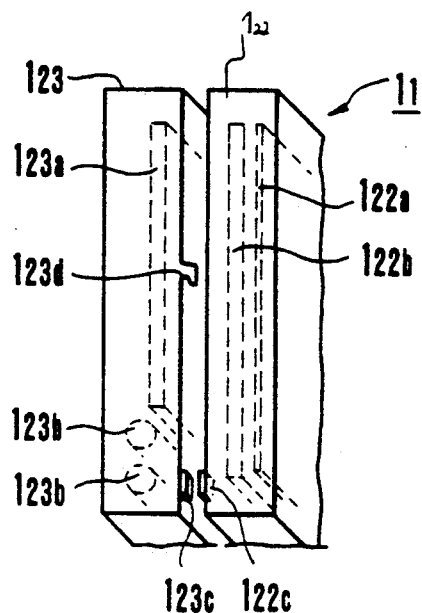
FIG. 34 is a perspective view showing a structure of a display.

FIG. 34 shows still another embodiment of the present invention, in which a display unit $1_1$ is illustrated. The display unit $1_1$ is constituted by a display portion $1_{22}$ at the main body side and a display emphasizing portion $1_{23}$ detachable with respect to the display portion $1_{22}$. The display portion at the main body side includes a touch panel $1_{22a}$ capable of inputting handwritten characters, a transmission display element $1_{22b}$ such as a liquid crystal, and a connecting portion $1_{22c}$. The display emphasizing portion $1_{23}$ includes a light-emitting device $1_{23a}$, a battery $1_{23b}$, a connecting portion $1_{23c}$, and a pawl $1_{23d}$ for engaging the display portion $1_{22}$ at the main body side with the display emphasizing portion $1_{23}$. Referring to FIG. 34, the display emphasizing portion $1_{23}$ is removed from the display portion $1_{22}$.

In the apparatus having the above arrangement, when the display portion $1_{22}$ is mounted on the display emphasizing portion $1_{23}$, the connecting portions $1_{22c}$ and $1_{23c}$ are connected with each other, and illumination ON/OFF control is performed by a CPU at the main body side by using software via the connecting portions. Although the display emphasizing portion $1_{23}$ uses a light-emitting device, it may be a reflecting plate.

Since the display element of the display portion $1_{22}$ is of a transmission type, it can be used as an OHP sheet by removing the display emphasizing portion $1_{23}$. In this case, since the display screen can be projected in an enlarged scale, a lot of people can see the screen at the same time.

Figure 35:
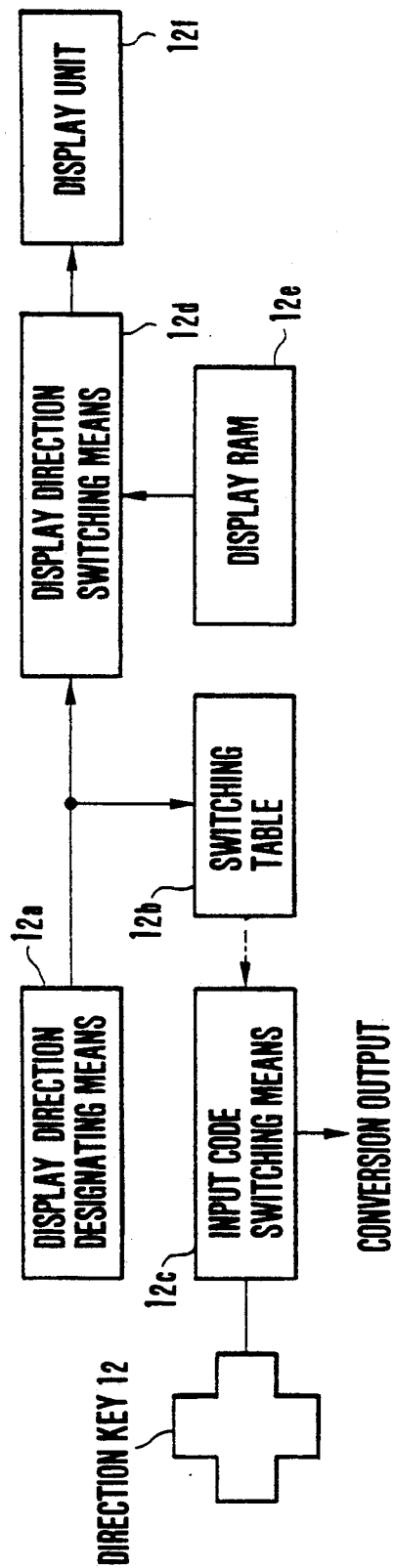
FIG. 35 is a block diagram showing a circuit for connecting a moving direction of a cursor when a longitudinal/lateral direction of the display is changed.

FIG. 35 shows still another embodiment of the present invention. Referring to FIG. 35, when a display direction is designated by a display direction designating means $1_{2a}$, this designation signal is supplied to a switching table $1_{2b}$ and a display switching means $1_{2d}$. Therefore, a display signal having a switched direction is output from a display RAM $1_{2e}$ and supplied to and displayed on a display unit $1_{2f}$. Therefore, regardless of whether a screen is vertically or horizontally set, a display direction can always be normal with respect to an operator by this holding method of the apparatus.

The switching table $1_{2b}$ stores key codes corresponding to display directions. The key codes are read out in accordance with the designation signal from the display direction designating means $1_{2a}$. A direction key is depressed in a direction with respect to an operator. That is, in order to move a curso upward, an operator depresses an upper portion of a cross direction key with respect to the operator. As a result, a signal corresponding to the position is output from the direction key, and a key code in a direction designated by the display direction designating means $1_{2a}$ is output from the switching table $1_{2b}$ as described above. Examples of the key code are as shown in Table 3.

TABLE 3

| Screen Direction | Normal Key Direction | | | |
|---|---|---|---|---|
| | Up | Right | Down | Left |
| Normal | Up | Right | Down | Left |
| 90° Right | Right | Down | Left | Up |
| Inverted | Down | Left | Up | Right |
| 90° Left | Left | Up | Right | Down |

Figure 36:
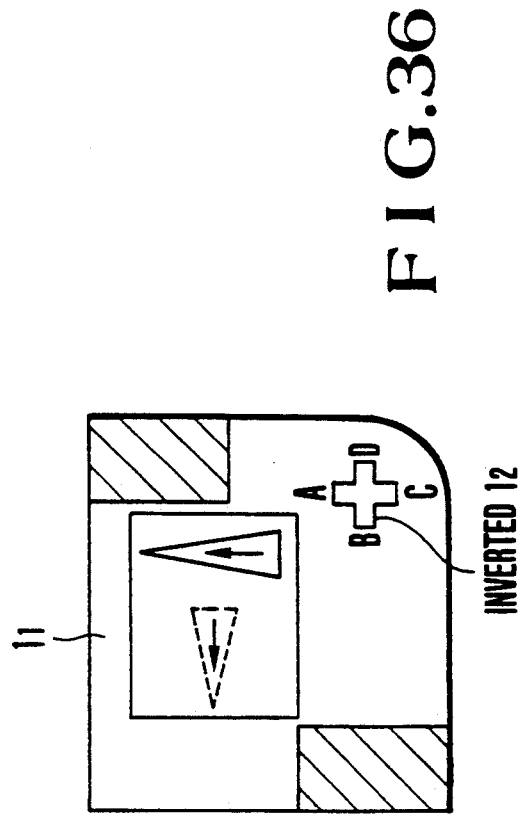
FIG. 36 is a view for explaining a structure for detecting the longitudinal/lateral direction of the display in accordance with a holding direction.

That is, when the apparatus is used in a 90°-right state, i.e., when the apparatus is pivoted to the right through 90°, a graphic pattern displayed as indicated by a solid line in FIG. 36 is pivoted through 90° as indicated by a dotted line shown in FIG. 36. Therefore, in this 90°-right state, a key (represented by symbol B) of a cursor key $1_2$ for moving the cursor to the left upon normal use is used to move it upward. Therefore, by changing functions of the cursor key $1_2$ as shown in Table 3 in accordance with the direction of the screen, a user can always perform a key operation in accordance a physical position of the cursor key without paying any attention even if the direction of the screen is changed.

Figure 37:
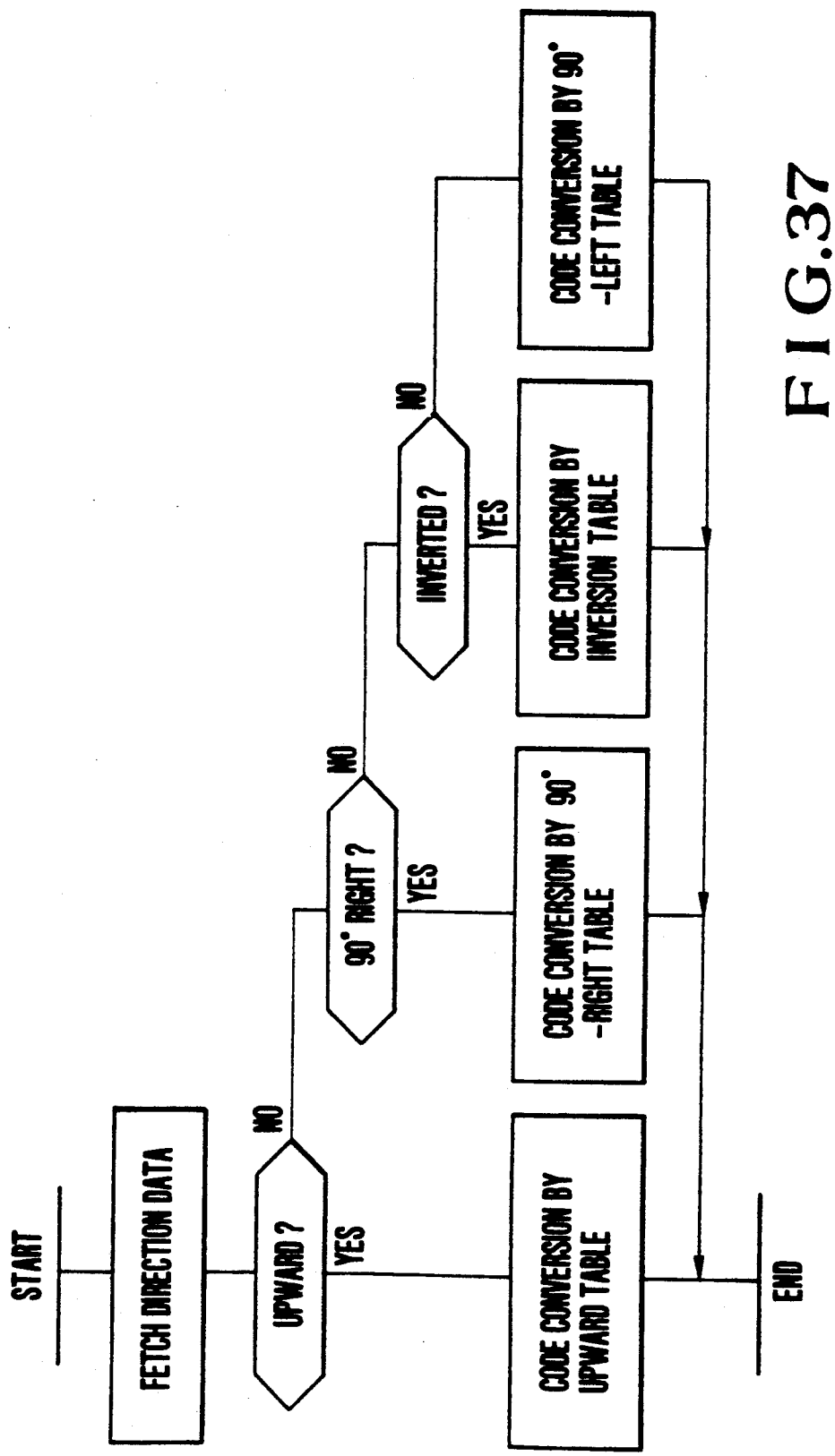
FIG. 37 is a flow chart for explaining an operation for correcting the moving direction of the cursor when the longitudinal/lateral direction of the display is changed.

FIG. 37 shows an operation of the above apparatus, in which a predetermined table is selected in accordance with the direction.

FIG. 36 shows a detailed arrangement of the display direction designating means. Referring to FIG. 36, contact sensors are provided at the rear sides of hatched portions, and a designation signal is output from each sensor. That is, since a position held by a user is detected by the sensor, the direction of the screen is automatically determined on the basis of the signal. In this case, predetermined input keys are preferably provided at both the hatched portions for convenience.

Figure 38:
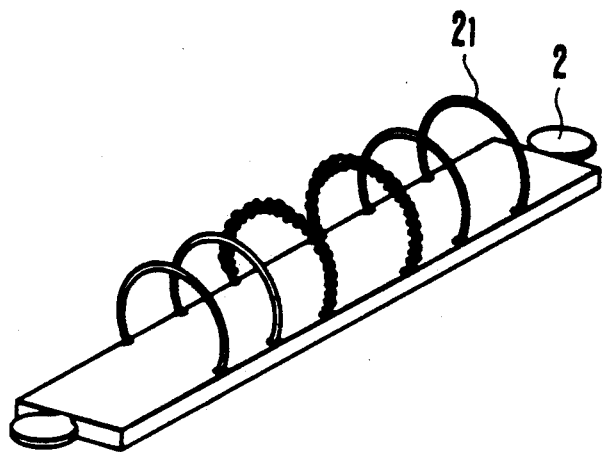
FIGS. 38 and 39 are perspective views showing an electromagnetic coupling means arranged at the expansion card holder side to perform communication between the expansion card holder and the expansion card.
Figure 39:
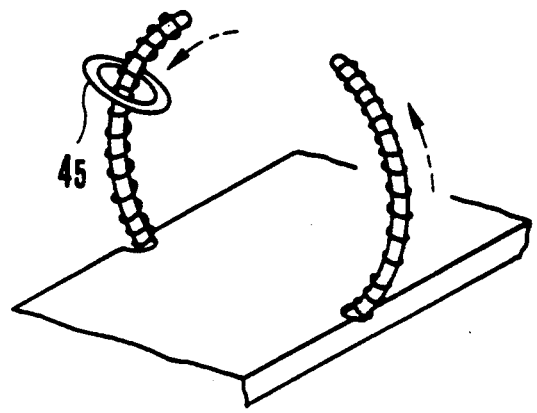

FIG. 38 shows still another embodiment of the present invention, in which an electromagnetic induction coil is wound around central rings of rings $2_1$ of an expansion card holder 2 so as to substantially cover the central rings. As shown in FIG. 39, this coil is independently wound around right and left rings, and their winding directions are set such that magnetic fields generated by the respective coils cumulatively act.

Figure 40:
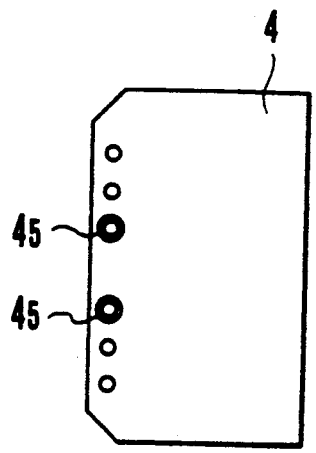
FIG. 40 is a view showing an electromagnetic coupling means arranged at the expansion card side.

In this manner, a coil at the main body side is formed around the ring $2_1$ of the expansion card holder 2, and air-core coils $4_5$ inserted in holding holes of an expansion card 4 as shown in FIG. 40 are set to be perpendicular to the ring $2_1$ as shown in FIG. 39 (in FIG. 39, only the air-core coil $4_5$ of the expansion card is illustrated). Therefore, communication can be performed between the main body and the expansion card in a noncontact state.

Figure 41:
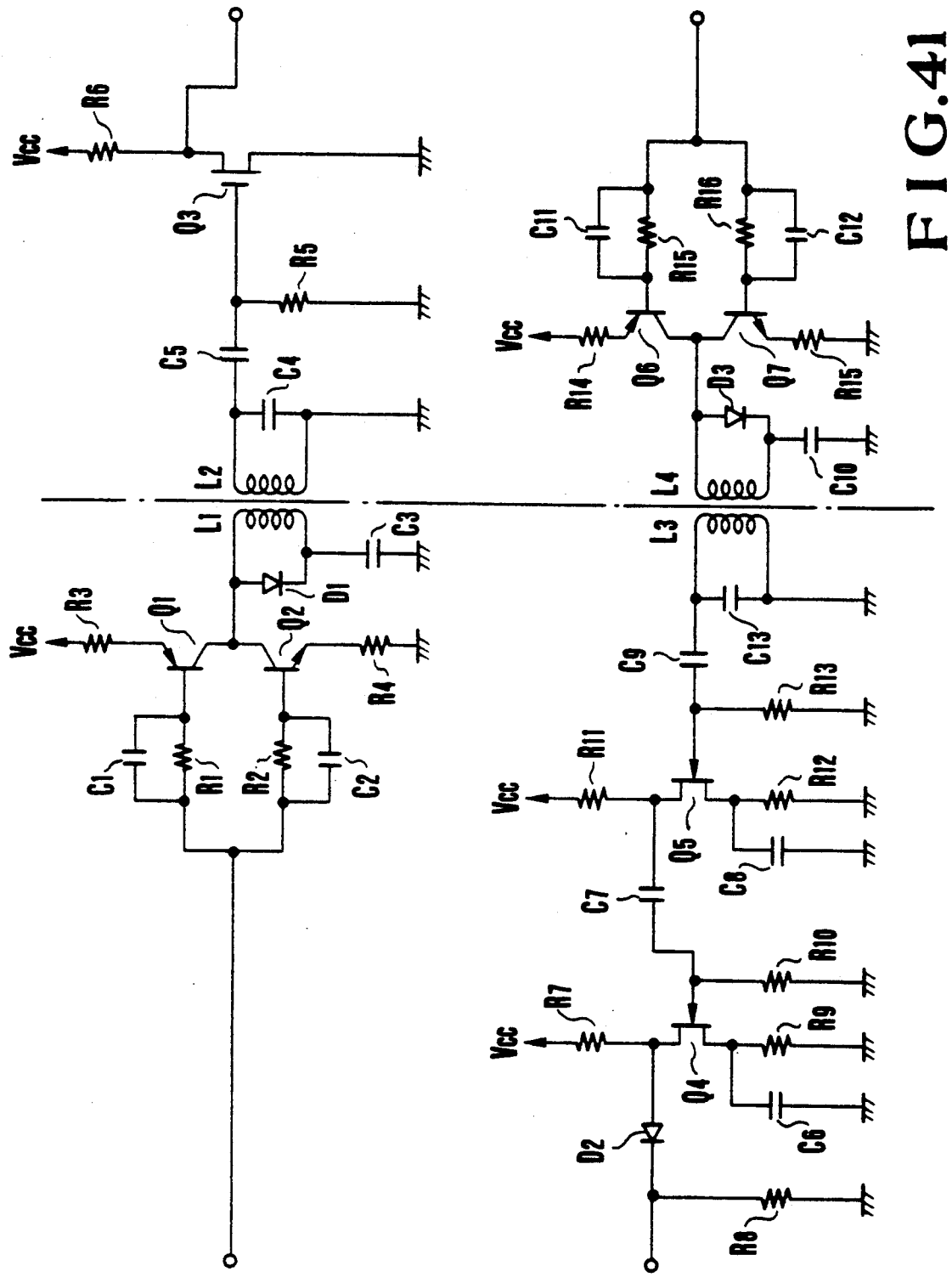
FIG. 41 is a circuit diagram showing a circuit for performing electromagnetic-coupled communication between the expansion card holder and the expansion card.

FIG. 41 shows a circuit of a transmitting circuit and a receiving circuit for performing data transmission via the communicating means having the above arrangement. This circuit is characterized by a portion constituted by transistors Q1 and Q2, resistors R3 and R4, a diode D1, coils L1 and L2, and a capacitor C2. In order to transmit information by electromagnetic induction, it is preferred to flow a large current to a coil. This circuit, however, is designed to be driven by, e.g., a coin-type lithium battery which cannot generate a large current. If the battery is forced to generate a large current, quality of the battery is degraded. This problem is solved by setting the resistances and capacitance of the resistors R3 and R4 and the capacitor C2 at 270 Ω, 56 Ω, and 10,000 PF, respectively.

That is, the capacitor C2 is charged by a small current via the resistor R3 having 270 Ω to reduce a load of a battery. Upon discharge of the capacitor C2, a large current is flowed to the coil L1 via the resistor R4 having 56 Ω to generate a large magnetic field.

Signal transmission is performed via this circuit as shown in FIG. 42. That is, as shown in FIG. 42, a data pattern having 11 bits, i.e., one start bit of level "0", data bits D0 to D7, one parity bit, and a stop bit of level "1" is transmitted. FIGS. 43(a) to 43(e) show how the respective bits are transmitted. That is, one bit shown in FIG. 43(a) is finely modulated as shown in FIG. 43(b), and this modulated wave is transmitted via the coil as shown in FIG. 43(c). At the receiving side, the transmitted wave is digital-converted as shown in FIG. 43(d) and extracted as reception data as shown in FIG. 43(e).

A message format is as follows. That is, except for some messages, a basic message including both a message from the main body to the expansion card and that from the expansion card to the main body has a format of command—logic address—data string—message end—BCC. If no data string is present or a data length is fixed, the message end and the BCC are omitted. The BCC is an exclusive OR of all the data from the command to the message end.

As has been described above, the present invention comprises an expansion card holder mounted on a main body, a necessary number of expansion cards held by the holder, and a communicating means for transmitting/receiving data between the held expansion cards and the main body. Therefore, a necessary number of expansion cards can be used to realize simultaneous use of different types of data bases which cannot be performed by a conventional apparatus. Therefore, unlike in a conventional apparatus, since an expansion card need not be replaced to be used in accordance with the type of data base, a compact apparatus which can be easily used can be provided.

What is claimed is:

1. An electronic system pocketbook apparatus comprising:
   a foldable and portable main body having the form of a book and composed of a front cover portion, a rear cover portion and a back portion connecting the front and rear cover portions together in a manner to allow relative movement of said cover portions between a closed position in which said cover portions face one another in the manner of the covers of a closed book and an open position in which said cover portions are separated from one another in the manner of the covers of an open book, circuit means including a CPU and data processing units housed in at least one of said cover portions, and a display unit housed in one of said cover portions;
   an expansion card holder mounted on said main body for holding at least one expansion card;
   an expansion card held by said expansion card holder and containing an electric circuit; and
   communicating means connecting said circuit of said expansion card via said expansion card holder to said circuit means for performing data transmission/reception between said held expansion card and said main body via said expansion card holder.

2. An apparatus according to claim 1, wherein said communicating means includes a first coil carried by said expansion card holder, and said expansion card includes a second coil embedded in said expansion card and connected to said first coil by electromagnetic induction.

3. An apparatus according to claim 1, wherein said communicating means comprise optical transmitting-/receiving means arranged at a connecting portion between said expansion card and said expansion card holder.

4. An apparatus according to claim 3, wherein said optical transmitting/receiving means is infrared transmitting/receiving means.

5. An apparatus according to claim 1, further comprising a touch panel housed in one of said cover portions.

6. An apparatus according to claim 5, wherein said touch panel is combined with said display unit.

7. An apparatus according to claim 5 wherein said circuit means comprise:
touch panel reading means responsive to the area of said touch panel which is being contacted during a writing operation such that contact of an area which is less than a certain size constitutes an information writing operation and contact of an area which is greater than a certain size constitutes an information erasing operation; and a controller for performing control in accordance with the area of said touch panel being contacted.

8. An apparatus according to claim 5 wherein:
said display unit has a display screen; and
said circuit means are operative to produce a screen display range designation signal and t cause an image corresponding to the designation signal to be displayed on said screen.

9. An apparatus according to claim 8, further comprising;
means for displaying a selection key having a range to be designated by the display range designation signal;
means for outputting a key code corresponding to the display range designation signal from data in a memory for storing key codes of all input keys; and
key code selecting means for outputting a key code selected from a screen by an operator from key codes selected in correspondence with the display range designation signal.

10. An apparatus according to claim 9, wherein said display unit is divided into a plurality of blocks.

11. An apparatus according to claim 10, wherein each of said blocks includes:
a first memory for storing a key name corresponding to said block; and
a second memory for storing a key code corresponding to coordinates on said display unit.

12. An apparatus according t claim 11, further comprising:
block detecting means for detecting a touched block;
first reading means for reading out a key name registered in said detected block by referring to said first memory; and
second reading means for reading out a key code corresponding to the readout key name by referring to said second memory.

13. An apparatus according to claim 1 wherein said circuit means are operative for displaying a cursor on said display unit, and further comprising a cursor moving direction designation key for designating a cursor moving direction; and cursor direction switching means for allowing the cursor moving direction to coincide with the orientation of said main body.

14. An apparatus according to claim 13, wherein said cursor direction switching means includes a cursor key pad capable of rotating parallel to a mounting surface.

15. An apparatus according to claim 13, wherein said cursor direction switching means includes:
first reading means for reading out, in accordance with a signal from said display direction designating means, a key code according to a display direction from a memory for storing a key code for each direction; and
a cursor moving direction control circuit for controlling the moving direction of said cursor in accordance with the readout key code.

16. An apparatus according to claim 1 wherein said expansion card holder is switchable between a released condition in which the expansion card may be removed from or assembled with said expansion card holder, and a closing condition in which the expansion card are retained by said expansion card holder and are connected to said circuit means; said expansion card holder comprises detecting means for providing a signal when said expansion card holder is switched to its released condition; and said circuit means are connected to said detecting means and are operative or halting operation of said apparatus when the signal is provided by said detecting means.

17. An apparatus according to claim 16, wherein said circuit means include operation restarting means for restarting communication and the stopped operation of said apparatus when said expansion card holder is placed in its closing condition closing release.

18. An apparatus according to claim 17, wherein said communicating means supply power to said expansion card from said main body.

19. An apparatus according to claim 18, wherein said circuit means include:
power interrupting means for interrupting the power supplied to said expansion card in accordance with an output from said detecting means; and
operation stopping means for stopping operation of said apparatus after the power is stopped.

20. An apparatus according to claim 1, further comprising;
a cover switch for outputting, when said cover means release said cover portions, an operation signal indicating release; and
a clock signal transmitting circuit for transmitting, when the operation signal is output from said cover switch, a clock signal for operating said circuit means.

21. An apparatus according to claim 20, further comprising a power source.

22. An apparatus according to claim 21, further comprising a power source forming circuit for forming a supply path of a power source current when the operation signal is output from said cover switch.

23. An apparatus according to claim 21 wherein:
said expansion card holder has a plurality of engaging portions at two end portions in the longitudinal direction thereof and a lower portion in contact with said two end portions;
and said apparatus further comprises:
a battery holder to be fitted in a rear surface of said expansion card holder;
a connector provided at two end portions in the longitudinal direction at a fitting surface side of said battery holder with respect to said expansion card holder and having a predetermined number of electrodes;

a first electronic processor having a portion to be engaged with on of said engaging portions of said expansion card holder and a connector to be fitted in one of said connectors of said battery holder;

a second electronic processor having a portion to be engaged with the other engaging portion of said expansion card holder and a connector to be fitted in the other connector of said battery holder; and a cover to be mounted on a rear surface side of said battery holder.

24. An apparatus according to claim 1 wherein said communicating means comprise:

expansion card side transmitting/receiving means mounted on a holder side portion of one said expansion card; and main body side transmitting/receiving means, provided near a central axis of an inner rear surface of said main body, for performing communication with respect to said expansion card side transmitting/receiving means.

25. An apparatus according to claim 24 wherein said one expansion card has an edge adjacent said card holder and said expansion card side transmitting/receiving means form with said main body side transmitting/receiving means signal transmission paths which are oblique to said expansion card edge.

26. An apparatus according to claim 1, wherein said display unit is a transmission liquid crystal.

27. An apparatus according to claim 26 wherein said display unit has a display portion which is transparent to light.

* * * * *